US012647621B2

(12) United States Patent
Galpin et al.

(10) Patent No.: US 12,647,621 B2
(45) Date of Patent: Jun. 2, 2026

(54) GDR ADAPTED FILTERING

(71) Applicant: InterDigital CE Patent Holdings, SAS, Paris (FR)

(72) Inventors: Franck Galpin, Thorigne-Fouillard (FR); Franck Aumont, Vern sur Seiche (FR); Tangi Poirier, Thorigne-Fouillard (FR); Gaëlle Martin-Cocher, Toronto (CA)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 18/722,888

(22) PCT Filed: Dec. 21, 2022

(86) PCT No.: PCT/EP2022/087301
§ 371 (c)(1),
(2) Date: Jun. 21, 2024

(87) PCT Pub. No.: WO2023/118339
PCT Pub. Date: Jun. 29, 2023

(65) Prior Publication Data
US 2025/0234047 A1 Jul. 17, 2025

(30) Foreign Application Priority Data

Dec. 21, 2021 (EP) ..................................... 21306886

(51) Int. Cl.
*H04N 19/82* (2014.01)
*H04N 19/117* (2014.01)

(52) U.S. Cl.
CPC ........... *H04N 19/82* (2014.11); *H04N 19/117* (2014.11)

200

(58) Field of Classification Search
CPC .............................. H04N 19/82; H04N 19/117
(Continued)

(56) References Cited

U.S. PATENT DOCUMENTS

2013/0182764 A1* 7/2013 Narroschke .......... H04N 19/159
375/240.12
2021/0203971 A1 7/2021 Chen et al.
2022/0224886 A1* 7/2022 Tsai ..................... H04N 19/117

OTHER PUBLICATIONS

Bross et al., "Versatile Video Coding Editorial Refinements on Draft 10", JVET-T2001-v2, Editors, Joint Video Experts Team (JVET) of ITU-T SG 16 WP 3 and ISO/IEC JTC 1/SC 29, 20th Meeting, by Teleconference, Oct. 7-16, 2020, pp. 1-511.
(Continued)

*Primary Examiner* — Amir Shahnami
(74) *Attorney, Agent, or Firm* — Condo Roccia Koptiw LLP

(57) ABSTRACT

Systems, methods, and instrumentalities are disclosed herein for the field of video compression. In examples, a video coding device may determine that a loop filtering mode is enabled for a picture. For a block in a region, whether neighboring samples are available for loop filtering associated with the block may be determined based on a location of the neighboring samples relative to the region. The block may be decoded based on the determination. In examples, a video encoder may obtain a picture. A loop filtering mode indication may be signaled indicating a loop filtering mode is enabled for the picture. For a block in a region, whether neighboring samples are available for loop filtering associated with the block may be determined based on a location of the neighboring samples relative to the region. The block may be decoded or encoded based on the determination.

15 Claims, 17 Drawing Sheets

(58) Field of Classification Search
    USPC ..................................................... 375/240.29
    See application file for complete search history.

(56)                    References Cited

OTHER PUBLICATIONS

Browne et al., "Algorithm Description for Versatile Video Coding and Test Model 14 (VTM 14)", JVET-W2002-v1, Editors, JVET of ITU-T SG 16 WP 3 and ISO/IEC JTC 1/SC 29, 23rd Meeting, by Teleconference, Jul. 7-16, 2021, pp. 1-105.
Damghanian et al., "AHG9: Signaling of Virtual Boundary Positions", Joint Video Experts Team (JVET) of ITU-T SG 16 WP 3 and ISO/IEC JTC 1/SC 29/WG11; 19th Meeting: by Teleconference, Jul. 1, 2020-Jun. 22, 2020, 3 pages.

* cited by examiner

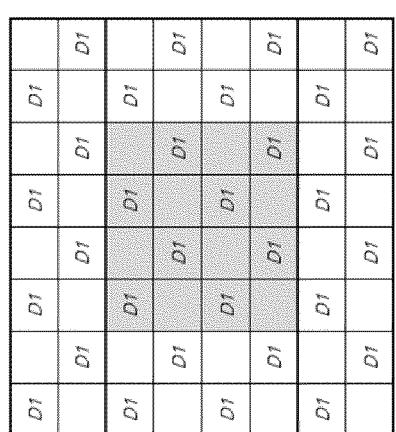
FIG. 9B
FIG. 9D
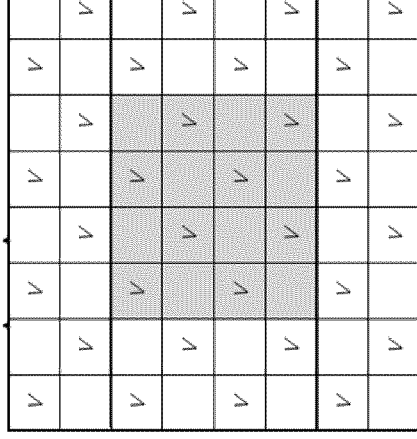
FIG. 9A
FIG. 9C

GDR ADAPTED FILTERING

CROSS-REFERENCE TO RELATED APPLICATIONS

This application is the National Stage Entry under 35 U.S.C. § 371 of Patent Cooperation Treaty Application No. PCT/EP2022/087301, filed Dec. 21, 2022, which claims the benefit of European Patent application Ser. No. 21/306, 886.9, filed Dec. 21, 2021, the disclosure of which is incorporated herein by reference in its entirety.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed herein for the field of video compression.

In examples, a video decoder may determine that a loop filtering mode is enabled for a picture. The picture may include a number of regions. Based on the determination that the loop filtering mode is enabled, for a block (e.g., a current block) in a region within the number of regions, whether neighboring samples are available for loop filtering associated with the current block may be determined based on a location of the neighboring samples relative to the region. The current block may be decoded based on the determination of whether the neighboring samples are available for loop filtering.

In examples, a video encoder may obtain a picture. The picture may include a number of regions. A loop filtering mode indication may be signaled. The loop filtering mode may indicate a loop filtering mode is enabled for the picture. Based on the loop filtering mode being enabled, for a block (e.g., a current block) in a region within the number of regions, whether neighboring samples are available for loop filtering associated with the current block may be determined based on a location of the neighboring samples relative to the region. The current block may be encoded based on the determination of whether the neighboring samples are available for loop filtering.

For example, it may be determined the number of regions include a first region defining a clean area and a second region defining a dirty area. The clean area and the dirty area may be separated by a boundary (e.g., a virtual boundary). Based on the current block being in the dirty area and the neighboring samples being in the clean area, the neighboring samples may be determined to be available for loop filtering. The virtual boundary loop filtering indication may indicate the neighboring samples are available for loop filtering based on determining the neighboring samples are available for loop filtering. Based on the current block being in the clean area and the neighboring samples being in the dirty area, the neighboring samples may be determined to be unavailable for loop filtering. The virtual boundary loop filtering indication may indicate the neighboring samples are unavailable for loop filtering based on determining the neighboring samples are unavailable for loop filtering.

For example, it may be determined the number of regions include a first region defining a clean area and a second region defining a dirty area. The clean area and the dirty area may be separated by a boundary (e.g., a virtual boundary). A virtual boundary loop filtering indication may be obtained. The virtual boundary loop filtering indication may be configured to indicate whether the neighboring samples are available for loop filtering. The virtual boundary indication may indicate the neighboring samples are available for loop filtering based on the current block being in the dirty area and the neighboring samples being in the clean area. Based on the virtual boundary loop filtering indication indicating the neighboring samples are available for loop filtering, the neighboring samples may be determined to be available for loop filtering. The virtual boundary loop filtering indication may indicate the neighboring samples are unavailable for loop filtering based on the current block being in the clean area and the neighboring samples being in the dirty area. Based on the virtual boundary loop filtering indication indicating the neighboring samples are unavailable for loop filtering, the neighboring samples may be determined to be unavailable for loop filtering.

Examples are provided that may determine whether a loop filtering mode is enabled for a current frame. The current frame may include a plurality of regions divided by at least one boundary. A determination may be made for whether a region is allowed to use information outside of the region for loop filtering based on the region location relative to the at least one boundary. A dependent region indication associated with the region may be set based on the determination.

These examples may be performed by a device with a processor. The device may be an encoder or a decoder. These examples may be performed by a computer program product which is stored on a non-transitory computer readable medium and includes program code instructions. These examples may be performed by a computer program comprising program code instructions. These examples may be performed by a bitstream comprising information representative of the template matching prediction mode.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

BRIEF DESCRIPTION OF THE DRAWINGS

FIG. 9A illustrates an example of subsampled positions for a vertical gradient calculation.

FIG. 9B illustrates an example of subsampled positions for a horizontal gradient calculation.

FIGS. 9C-9D illustrate examples of subsampled positions for a diagonal gradient calculation.

DETAILED DESCRIPTION

A more detailed understanding may be had from the following description, given by way of example in conjunction with the accompanying drawings.

Figure 1A:
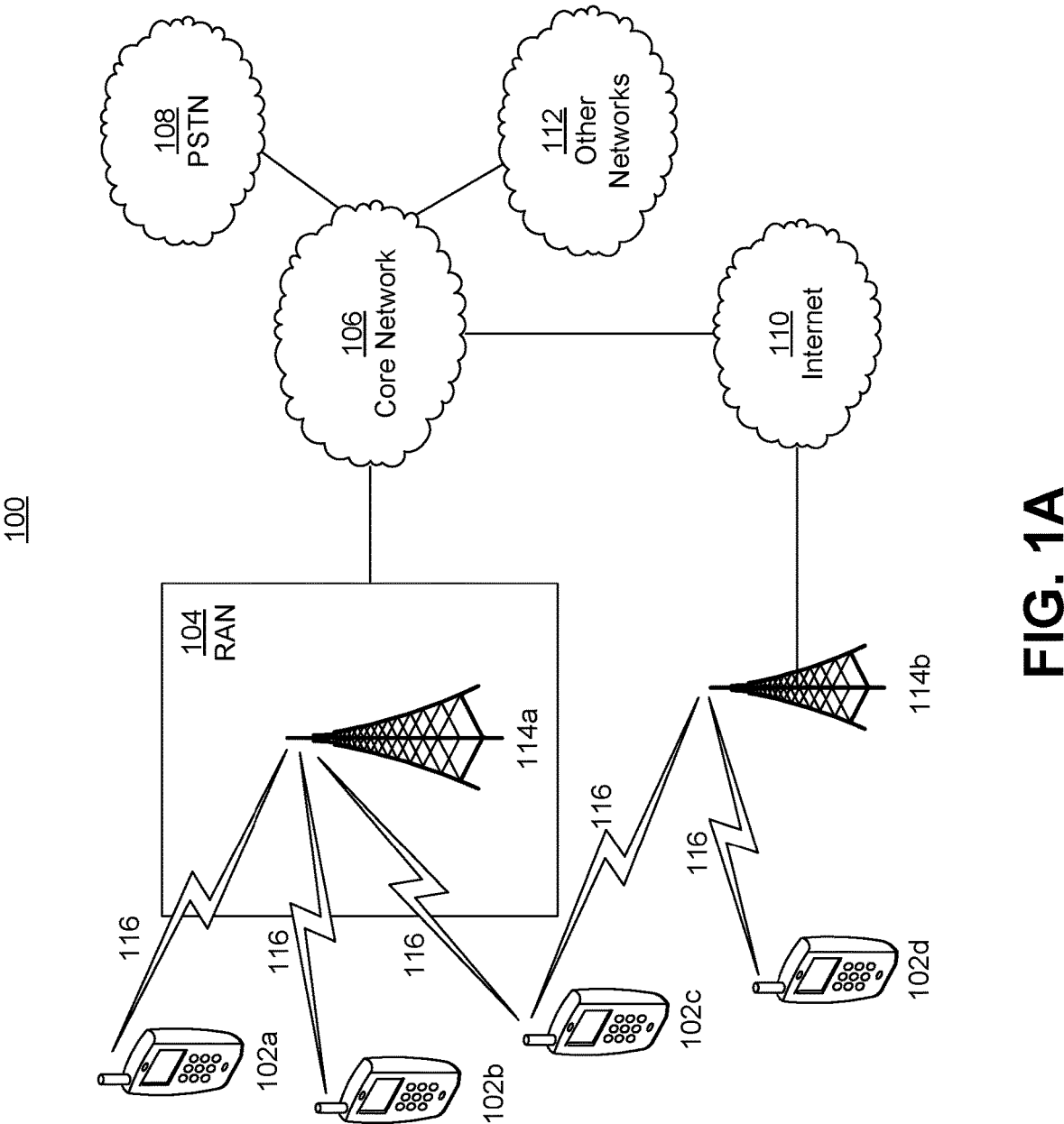
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
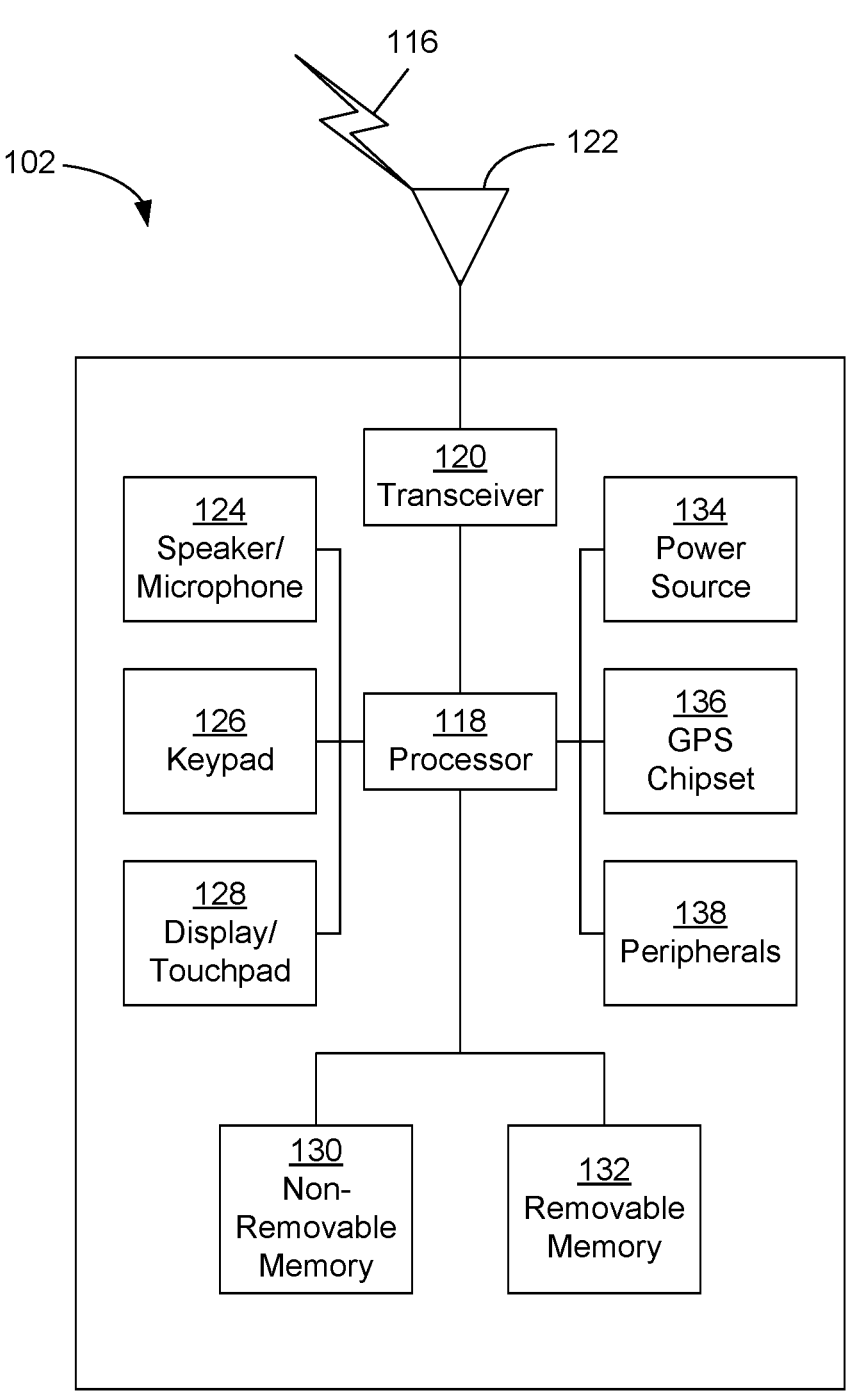
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. As suggested above, the processor 118 may include a plurality of processors. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
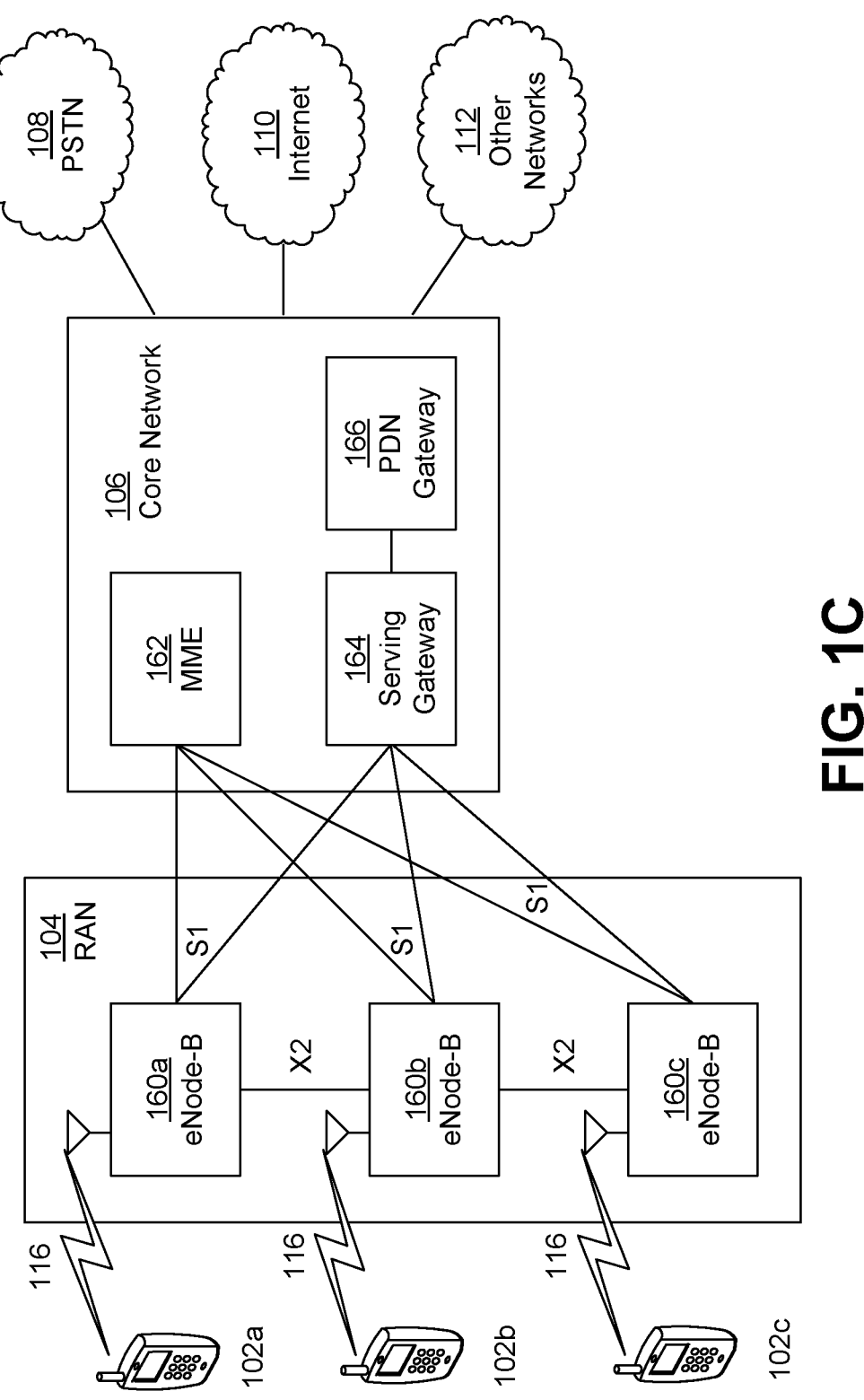
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
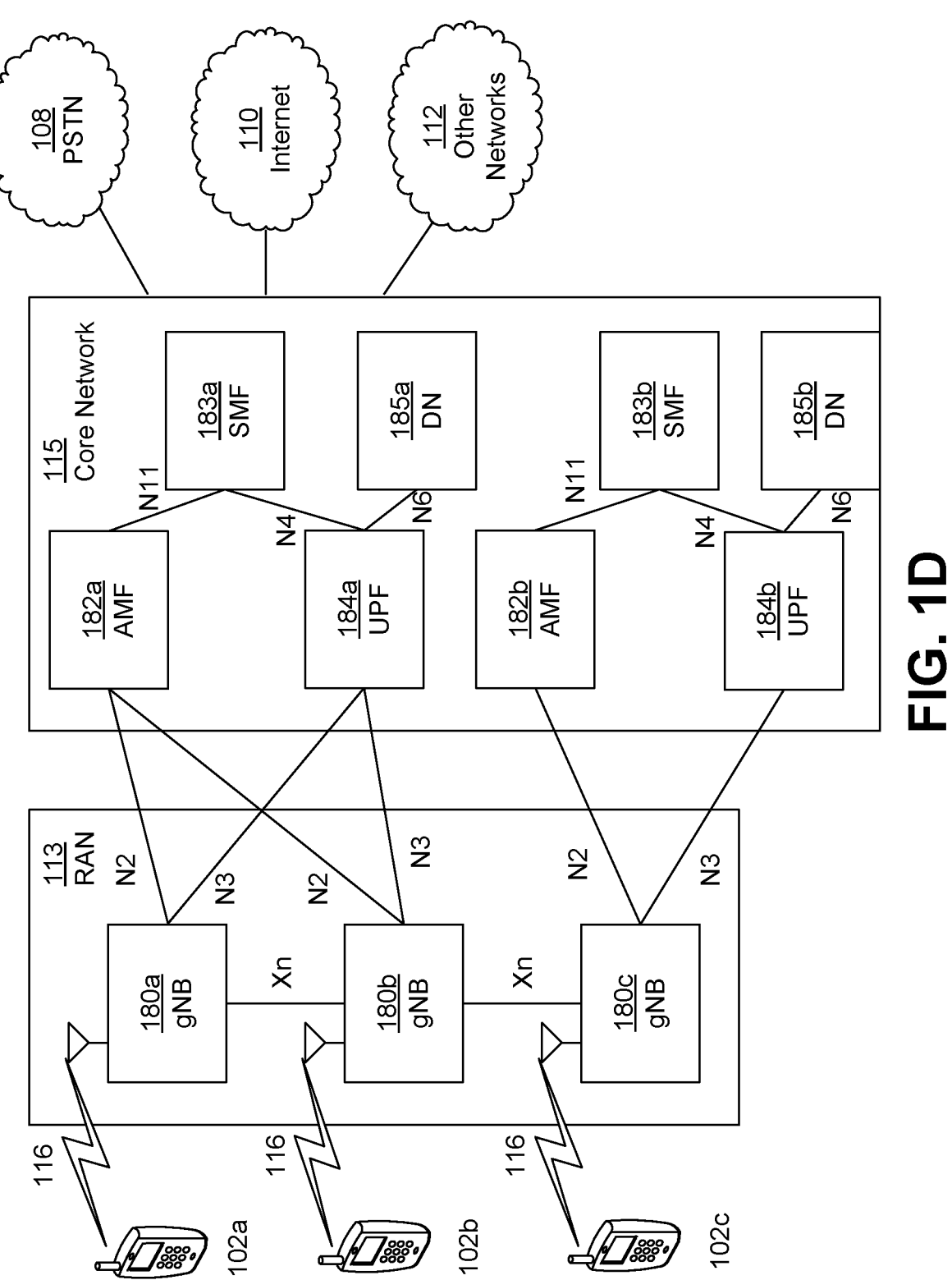
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-14 described herein may provide some examples, but other examples are contemplated. The discussion of FIGS. 5-14 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
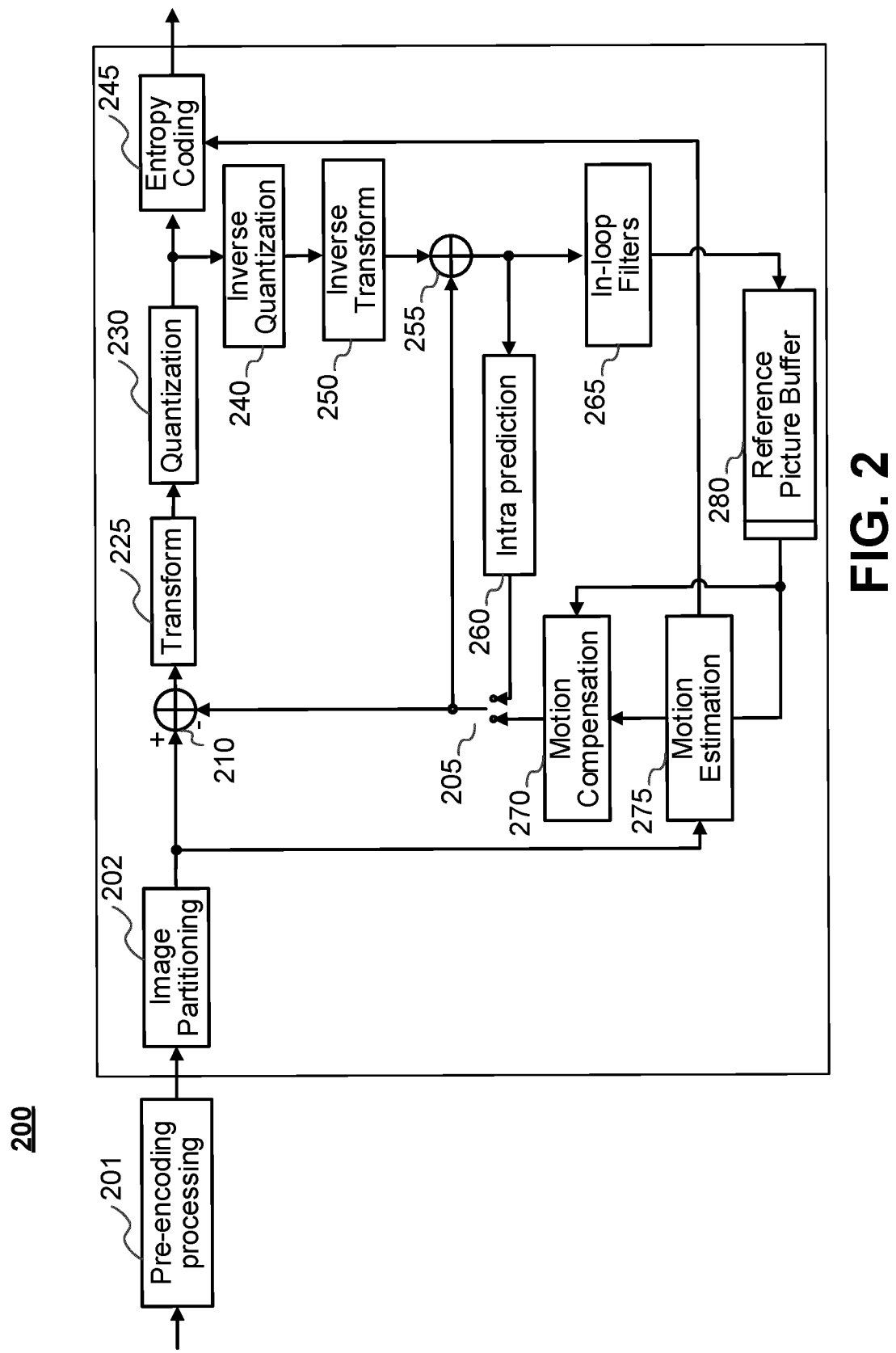
FIG. 2 illustrates an example video encoder.
Figure 3:
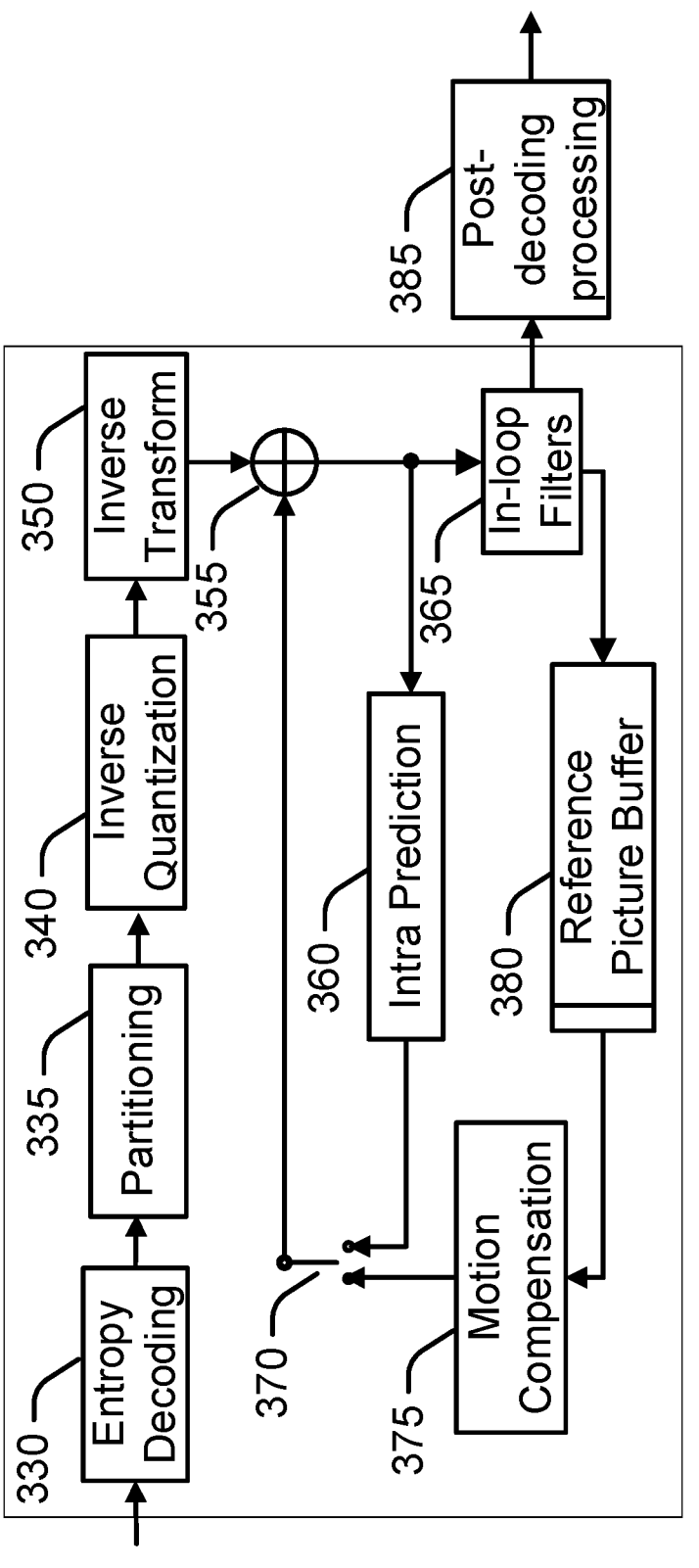
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as bits, bit depth, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the preprocessing and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
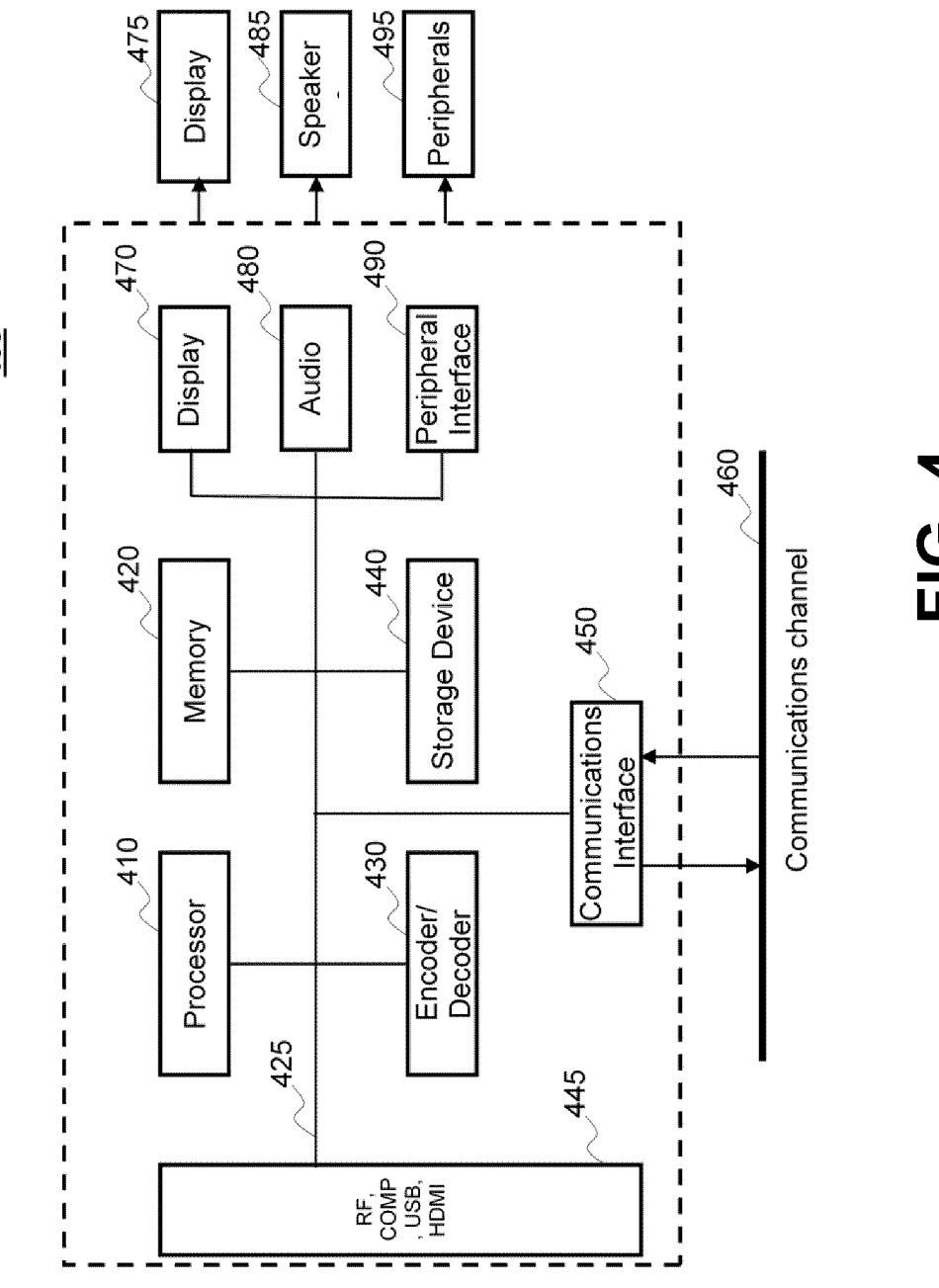
FIG. 4 illustrates an example of a a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining that a loop filtering mode is enable for a picture including a number of regions, determining, for a block in a region of the number of regions, whether neighboring samples are available for loop filtering associated with the current block based on a location of the neighboring samples relative to the region, and decoding the current block based on the determination of whether the neighboring samples are available for loop filtering, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, obtaining a picture including a number of regions, signaling a loop filtering mode indication that indicates a loop filtering mode is enabled for the picture, determining, for a region of the number of regions, whether neighboring samples are available for loop filtering associated with the current block based on a location of the neighboring samples relative to the region, encoding the current block based on the determination of whether the neighboring samples are available for loop filtering, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on template matching prediction, including but not limited to, pps_allow_loop_filter_per_slice_flag, pps_slice allow_loop_filter_flag, pps_loop_filter_across_slices_enabled_flag, pps_allow_loop_filter_per_tile_flag, pps_tile allow_loop_filter_flag, pps_loop_filter_across_tiles_enabled_flag, ph_allow_virtual_boundaries_loopfilter_on_area, ph_virtual_boundaries_loopfilter_per_boundary_flag, ph_num_ver_ virtual_boundaries, ph_num_hor_virtual_boundaries, flags sps_allow_virtual_boundaries_loopfilter_on_area, sps_virtual_boundaries_loopfilter_per_boundary_flag, sps_allow_ virtual_boundaires_loopfilter_on_area, gci_no_allow_virtual_boundaries_constraint_flag, ph_virtual_boundaries_present_ flag, ph_virtual_boundaries_present_flag, sps_loop_filter_across_subpic_exclusive, sh_deblocking_filter_disabled_flag, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory.

Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, an encoding function on an input for a block using a precision factor, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" may (e.g., may also) be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

These examples may be performed by a device with at least one processor. The device may be an encoder or a decoder. These examples may be performed by a computer program product which is stored on a non-transitory computer readable medium and includes program code instructions. These examples may be performed by a computer program comprising program code instructions.

Figure 5:
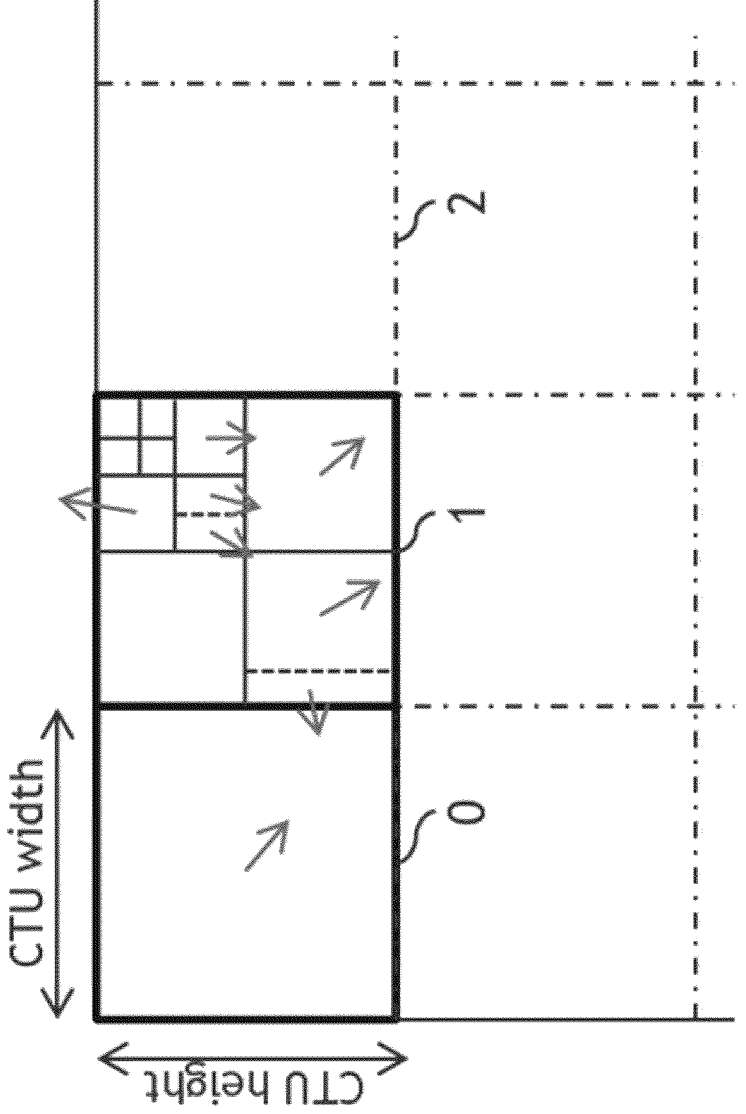
FIG. 5 illustrates an example of coding tree concepts to represent a compressed picture.

FIG. 5 illustrates an example of coding tree concepts to represent a compressed picture. Motion compensated temporal prediction may be employed to exploit the redundancy that exists between successive pictures of a video. Motion vectors may be associated with prediction units (PUs) (e.g., each motion vector may be associated with each prediction unit). A coding tree unit (CTU) (e.g., each CTU) may be represented by a coding tree in the compressed domain. The coding tree may be quad-tree division of the CTU, as shown in FIG. 5. Leaves (e.g., each leaf) of the coding tree may be called a coding unit (CU).

Figure 6:
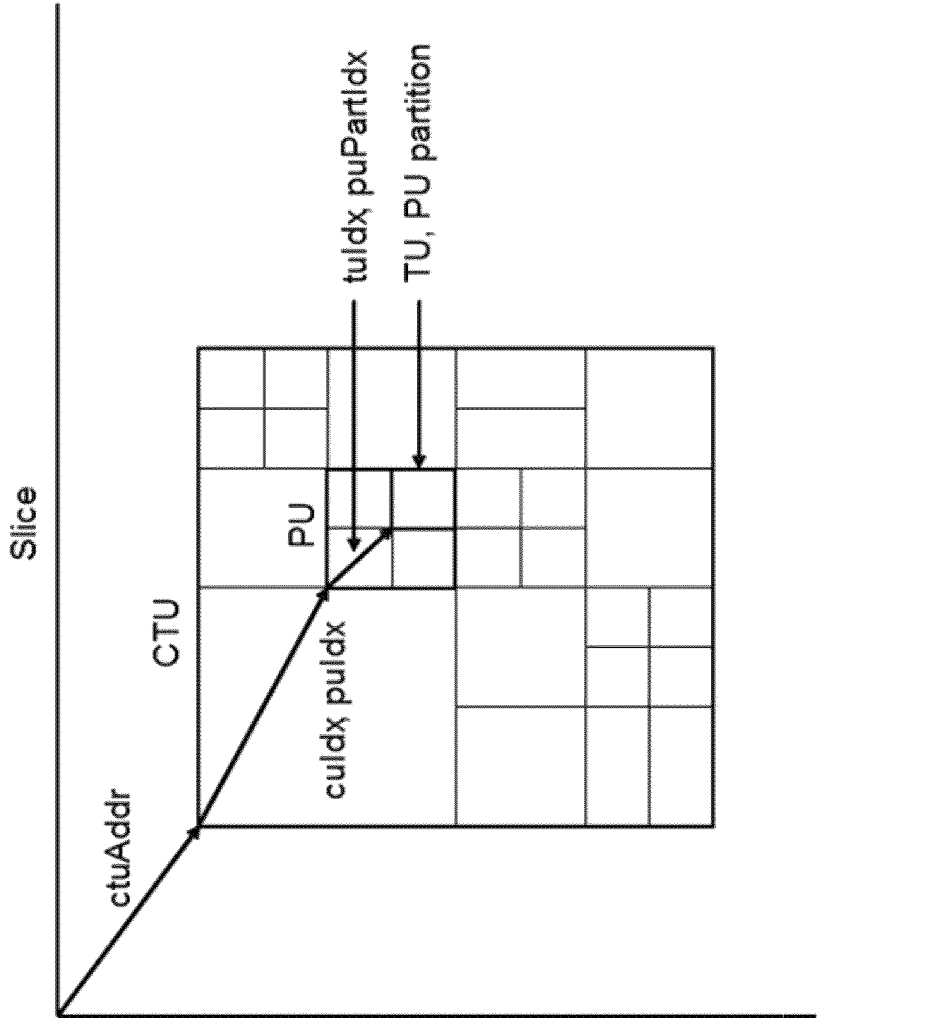
FIG. 6 illustrates an example of dividing a coding tree unit into coding units, prediction units, and transform units.

FIG. 6 illustrates an example of dividing a coding tree unit into CUs, PUs, and transform units. CUs (e.g., each CU) may be associated with intra or inter prediction parameters (e.g., prediction information). CUs (e.g., each CU) may be spatially partitioned into one or more PUs. The one or more PUs (e.g., each PU) may be assigned some prediction information. The intra or inter coding modes may assigned on the CU level, as shown in FIG. 6. Motion vectors may be assigned to PUs (e.g., one motion vector may be assigned to each PU). A motion vector may be used for motion compensated temporal prediction of the considered PU. In examples, a CU may not be divided into PU or TU, and some motion data may be assigned (e.g., directly assigned) to each CU. In examples, a CU may be divided into sub-CUs with motion vectors computed for the sub-CUs (e.g., a motion vector computed for each sub-CU).

Figure 7:
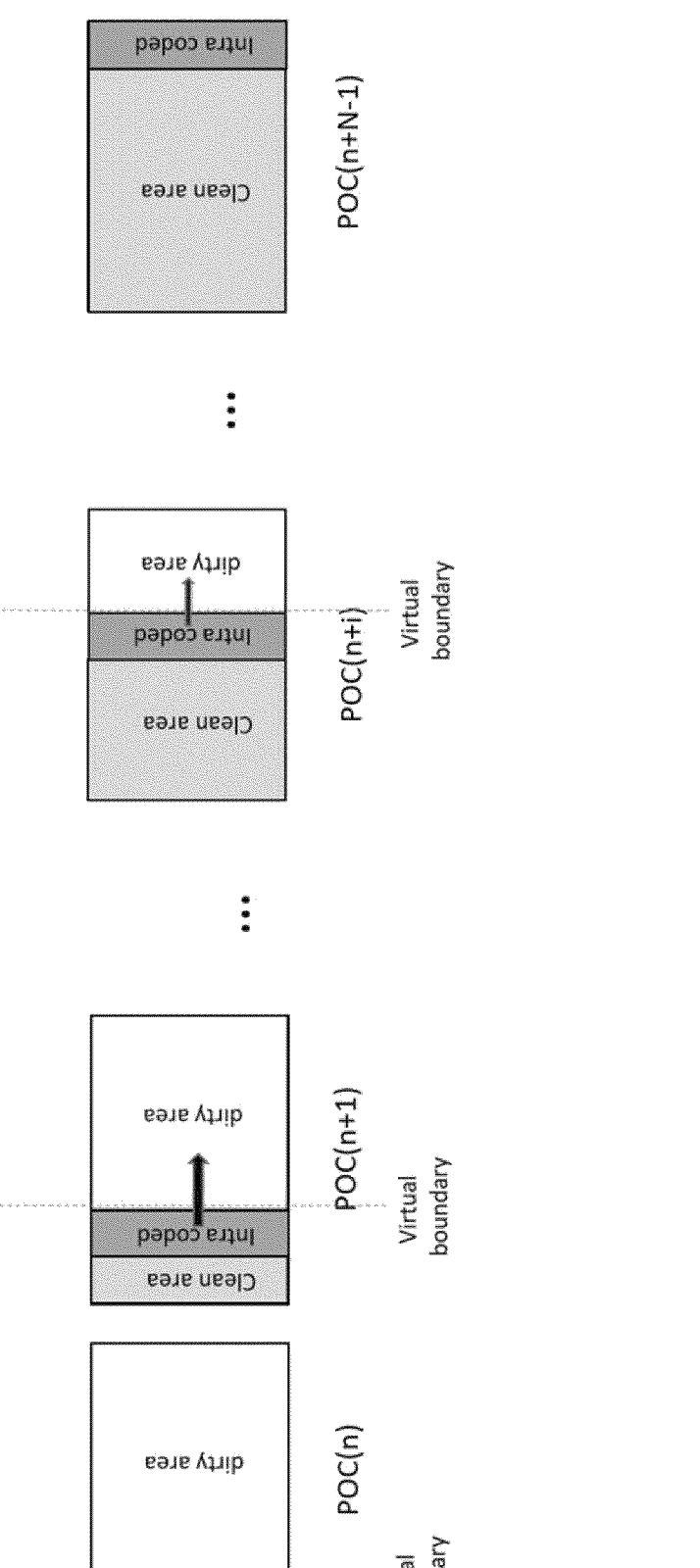
FIG. 7 illustrates an example of a Gradual Decoding Refresh (GDR) refresh concept.

FIG. 7 illustrates an example of a Gradual Decoding Refresh (GDR) refresh concept. GDR approaches (e.g., in a low delay context) may smooth the bitrate by spreading the encoding of a picture (e.g., an intra picture) among multiple frames while allowing for robust decoding by inserting resynchronization frames along the sequence. GDR may progressively refresh pictures by spreading coded (e.g., intra coded) areas over pictures (e.g., several pictures), which may be defined as the GDR period as shown in FIG. 7. FIG. 7 illustrates the concept of vertical GDR, where a GDR picture with a forced intra area may start at POC(n) and then, forced intra coded clean areas may gradually spread over the N pictures from left to right. At POC(n+N−1), the picture may be completely refreshed (e.g., intra refreshed).

The clean area may refer to the area which may be referenced by a future frame. The dirty area may refer to an area that may not be referenced by a future frame for robustness purpose. The restriction on areas that may not be referenced may be implemented at the encoder so that decoder may not need to perform this check.

POC(n+N−1) may be called the recovery point and the picture at the recovery point of POC(n+N−1) may be called the recovery point picture. The pictures between the GDR picture of POC(n) and the recovery point picture of POC (n+N−1) may be called recovering pictures of GDR picture of POC(n).

In examples, at least one boundary within the GDR pictures (e.g., within a current picture) is used to separate the clean area from the dirty area. The dirty area may be on a first side of a boundary and the clean area may be on a second side of the boundary. The GDR boundary may be at least one virtual boundary to allow finer granularity of progressive refresh (e.g., intra refresh). In examples, current picture may include slices divided by the GDR boundar(ies) within the current frame. In examples, the current picture may include tiles divided by the at least one GDR boundary within the current frame.

Examples of adaptive loop filter (ALF) are provided herein. The ALF may include luma ALF, chroma ALF, and cross-component ALF (CC-ALF). The ALF filtering process may be designed so that luma ALF, chroma ALF, and CC-ALF may be executed in parallel. The order of the filtering process may be the deblocking filter, the SAO, and the ALF. In examples, luma mapping with chroma scaling (LMCS) may be provided. The LMCS may modify the sample values before encoding and after reconstruction by redistributing the codewords across the dynamic range (e.g., the entire dynamic range). The LMCS may be performed before deblocking.

In examples, ALF with block-based filter adaption may be applied. For the luma component, one filter (e.g., among 25 filters) may be selected each 4×4 block, e.g., based on the direction and activity of local gradients.

Figure 8:
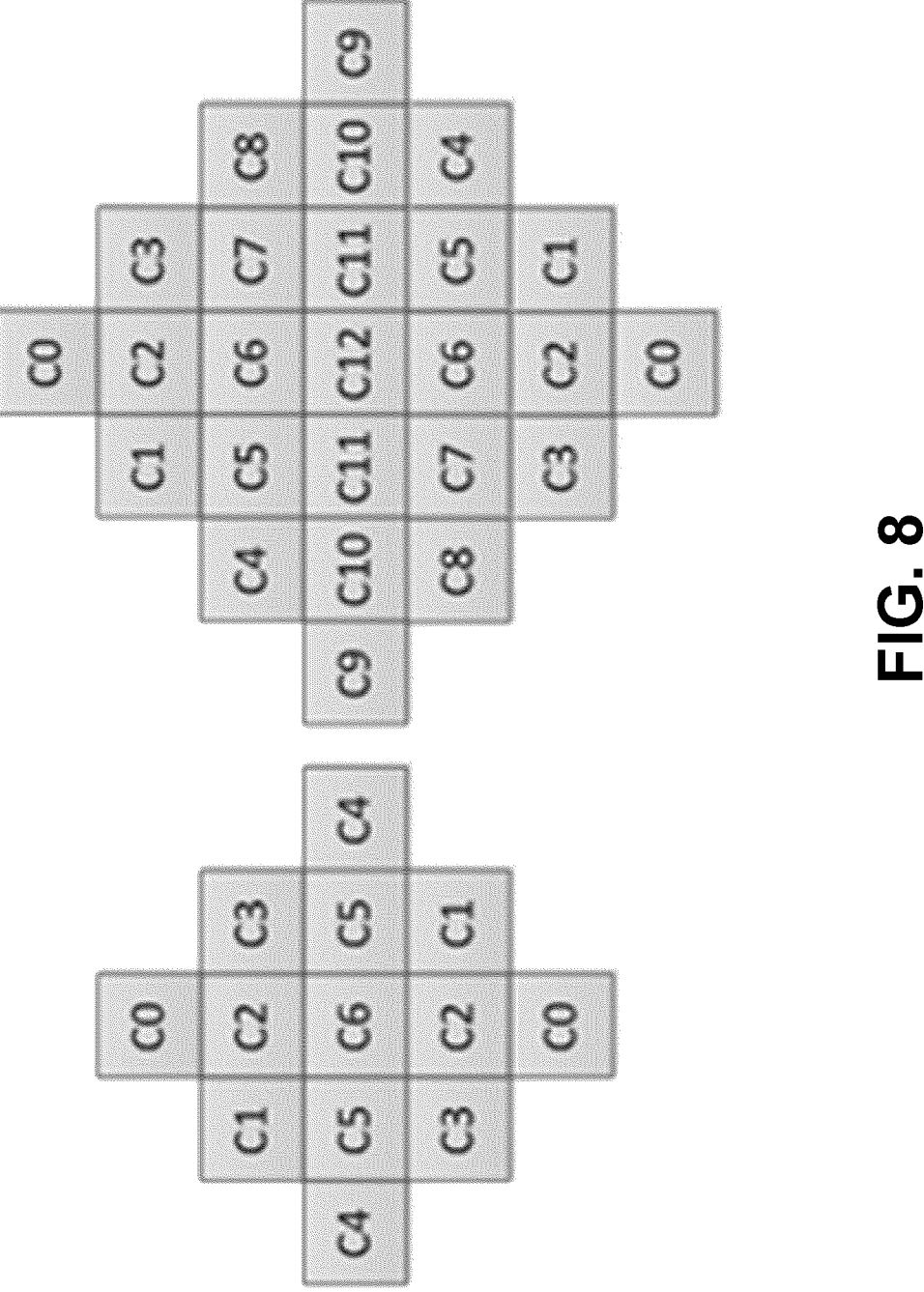
FIG. 8 illustrates an example of adaptive loop filter (ALF) filtered shapes.

FIG. 8 illustrates an example of ALF filtered shapes. Diamond filter shapes (e.g., such as two diamond filter shapes shown in FIG. 8) may be used. The 7×7 diamond shape may be applied for the luma component and the 5×5 diamond shape may be applied for the chroma components.

Block classification may be performed. For the luma component, each 4×4 may be categorized into one class (e.g., out of 25 classes). The classification index C is derived based on its directionality D and a quantized value of activity $\hat{A}$ as follows:

$$C = 5D + \hat{A}$$

To calculate D and $\hat{A}$, gradients of the horizontal, vertical, and two diagonals are first calculated using 1-D Laplacian as follows:

$$g_v = \sum_{k=i-2}^{i+3} \sum_{l=j-2}^{j+3} V_{k,l}, \; V_{k,l} = |2R(k, l) - R(k, l-1) - R(k, l+1)|$$

$$g_h = \sum_{k=i-2}^{i+3} \sum_{l=j-2}^{j+3} H_{k,l}, \; H_{k,l} = |2R(k, l) - R(k-1, l) - R(k+1, l)|$$

$$g_{d1} = \sum_{k=i-2}^{i+3} \sum_{l=j-3}^{j+3} D1_{k,l}, \; D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, \; D2_{k,l} = |2R(k, l) - R(k-1, l+1) - R(k+1, l-1)|$$

Where indices i and j represent the coordinates of the upper left sample within the 4×4 block and R(i, j) indicates a reconstructed sample at coordinate (i, j).

FIGS. 9A-9D illustrate examples of subsampled positions for a vertical, horizontal, and diagonal gradient calculations. The subsampled I-D Laplacian calculations may be applied to reduce the complexity of block classification. The subsampled positions may be used for gradient calculations of all directions, as shown in FIGS. 9A-9D.

D maximum and minimum values of the gradients of horizontal and vertical are represented as follows:

$$g_{h,v}^{max} = \max(g_h, g_v), \; g_{h,v}^{min} = \min(g_h, g_v)$$

The maximum and minimum values of the gradient of two diagonal directions are represented as follows:

$$g_{d0,d1}^{max} = \max(g_{d0}, g_{d1}), \; g_{d0,d1}^{min} = \min(g_{d0}, g_{d1})$$

To derive the value of the directionality D, these values may be compared against each other and with two thresholds $t_1$ and $t_2$ applied as follows:

(1) If both $$g_{h,v}^{max} \leq t_1 \cdot g_{h,v}^{min} \text{ and } g_{d0,d1}^{max} \leq t_1 \cdot g_{d0,d1}^{min}$$

are true, D is set to 0.

(2) If $$g_{h,v}^{max} / g_{h,v}^{min} > g_{d0,d1}^{max} / g_{d0,d1}^{min},$$

continue from (3); otherwise continue from (4).

(3) If $$g_{h,v}^{max} > t_2 \cdot g_{h,v}^{min}, D$$

is set to 2: otherwise D is set to 1.
(4) If $$g_{d0,d1}^{max} > t_2 \cdot g_{d0,d1}^{min}, D$$

is set to 4: otherwise D is set to 3.
The activity value A is represented as:

$$A = \sum_{k=i-2}^{i+3} \sum_{l=j-2}^{j+3} (V_{k,l} + H_{k,l})$$

A may be further quantized to the range of 0 and 4, inclusively, and the quantized value is represented as Â. For chroma components in a picture, block classification may not be applied.

Examples of geometric transformations of filter coefficients and clipping values are provided herein. Before filtering 4×4 luma blocks (e.g., each 4×4 luma block), geometric transformations such as rotation or diagonal and vertical flipping may be applied to the filter coefficients f(k, l) and to the corresponding filter clipping values c(k, l) depending on the gradient values calculated for that block. This may be equivalent to applying these transformations to the samples in the filter support region. Different blocks to which ALF is applied may be more similar by aligning their directionality.

Geometric transformations, including diagonal, vertical flip, and rotation are introduced as follows:

$$\text{Diagonal: } f_D(k, l) = f(l, k), c_D(k, l) = c(l, k),$$

$$\text{Vertical flip: } f_V(k, l) = f(k, K-l-1), c_V(k, l) = c(k, K-l-1)$$

$$\text{Rotation: } f_R(k, l) = f(K-l-1, k), c_R(k, l) = c(K-l-1, k)$$

Where K represents the size of the filter and $0 \le k, l \le K-1$ represent coefficient coordinates, such that location (0,0) is at the upper left corner and location (K−1, K−1) is at the lower right corner. The transformations are applied to the filter coefficients f(k, l) and to the clipping values c(k, l) depending on gradient values calculated for that block. The relationship between the transformation and the four gradients of the four directions are summarized in the following table:

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

At the decoder side, when ALF is enabled for a CTB, each sample R(i, j) within the CU is filtered, resulting in sample value R'(i, j) represented as follows:

$$R'(i, j) = R(i, j) + \left( \left( \sum_{k \neq 0} \sum_{l \neq 0} f(k, l) \times K(R(i+k, j+l) - R(i, j), c(k, l)) + 64 \right) \gg 7 \right)$$

where f(k, l) denotes the decoded filter coefficients, K(x, y) is the clipping function and c(k, l) denotes the decoded clipping parameters. The variable k and l may vary between −L/2 and L/2 where L denotes the filter length. The clipping function is represented by K(x, y)=min (y, max(−y, x)), which may correspond to the function Clip3 (−y, y, x). The clipping operation introduces non-linearity to make ALF more efficient by reducing the impact of neighbor sample values that are too different with the current sample value.

Examples of a cross component adaptive loop filter (CC-ALF) are provided herein. The CC-ALF may use luma sample values to refine chroma components (e.g., each chroma component) by applying an adaptive, linear filter to the luma channel. The CC-ALF may (e.g., may then) use the output of this filtering operation for chroma refinement.

Figure 10B:
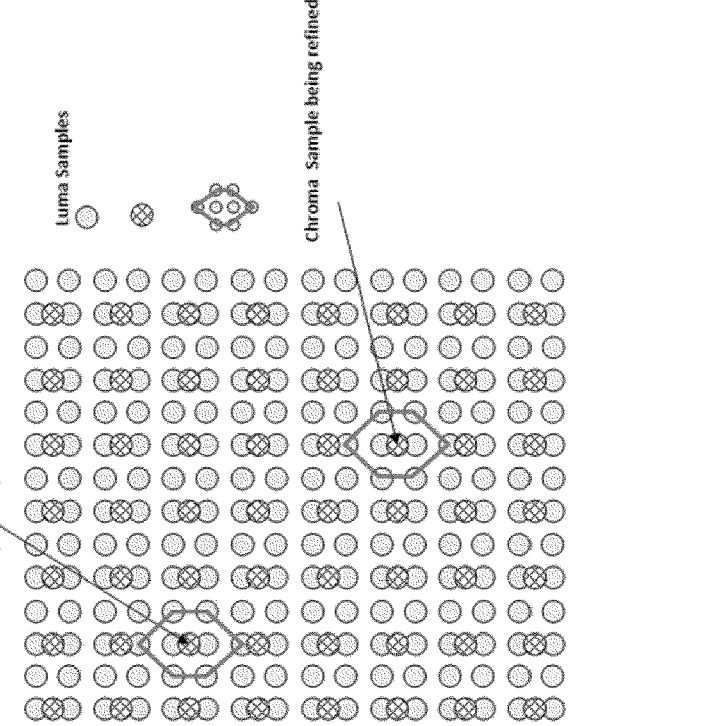
FIG. 10B illustrates an example of a placement of CC-ALF with respect to a diamond shaped filter.
Figure 10A:
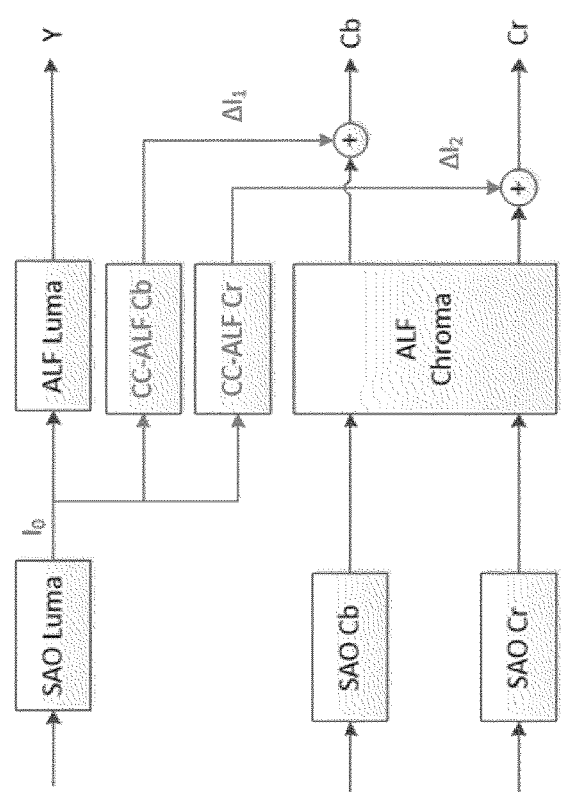
FIG. 10A illustrates an example of a placement of cross-component ALF (CC-ALF) with respect to other loop filters.

FIG. 10A illustrates an example of a placement of CC-ALF with respect to other loop filters (e.g., the SAO, luma ALF, and chroma ALF processes). FIG. 10B illustrates an example of a placement of CC-ALF with respect to a diamond shaped filter. Filtering in CC-ALF may be accomplished by applying a linear, diamond shaped filter.

Filters may be used for chroma channels (e.g., one filter may be used for each chroma channel), and the operation is represented as follows:

$$\Delta I_i(x, y) = \sum_{(x_0, y_0) \in S_i} I_0(x_Y + x_0, y_Y + y_0) c_i(x_0, y_0)$$

where (x, y) is chroma component i location being refined $(x_Y, y_Y)$ is the luma location based on (x, y), $S_i$ indicates filter support area in luma component, and $c_i(x_0, y_0)$ represents the filter coefficients. The luma filter support may the region collocated with a chroma sample (e.g., the current chroma sample) when (e.g., after) accounting for the spatial scaling factor between the luma and chroma planes.

CC-ALF filter coefficients may be computed by minimizing the mean square error of each chroma channels with respect to the original chroma content. A coefficient derivation process similar to the one used for chroma ALF may be performed. For example, a correlation matrix may be derived, and the coefficients may be computed using a Cholesky decomposition solver in an attempt to minimize a mean square error metric. For example, a maximum number of filters (e.g., 8 CC-ALF filters) may be obtained and transmitted per picture. The resulting filters may (e.g., may then) be indicated for chroma channels (e.g., for each of the two chroma channels) on a CTU basis.

Characteristics of CC-ALF may include one or more of the following: using a 3×4 diamond shape with eight taps; transmitting seven filter coefficients in the APS; the transmitted coefficients having a 6-bit dynamic range and being restricted to power-of-2 values; the eighth filter coefficient being derived at the decoder such that the sum of the filter coefficients is equal to 0; an APS referenced in the slice header; CC-ALF filter selection being controlled at CTU-level for each chroma component; or boundary padding for the horizontal virtual boundaries using the same memory access pattern as luma ALF.

An example encoder may be configured to enable some basic subjective tuning through the configuration file. When enabled, CC-ALF may be applied in regions that are coded with high QP and are either near mid-grey or include a large amount of luma high frequencies. This may be accomplished by disabling the application of CC-ALF in CTUs where any of the following conditions are true: the slice QP value minus 1 is less than or equal to the base QP value; the number of chroma samples for which the local contrast is greater than (1<<(bitDepth−2))−1 exceeds the CTU height, where the local contrast is the difference between the maximum and minimum luma sample values within the filter support region; or more than a quarter of chroma samples are in the range between (1<<(bitDepth−1))−16 and (1<<(bit-Depth−1))+16. This functionality may provide some assurance that CC-ALF does not amplify artifacts introduced earlier in the decoding path. Some encoder implementations may not use this functionality or incorporate strategies suitable for their encoding characteristics.

Examples of combined inter and intra prediction (CIIP) are provided herein. If a CU is coded in merge mode, if the CU includes at least 64 luma samples (that is, CU width times CU height is equal to or larger than 64), and if both CU width and CU height are less than 128 luma samples, an additional flag may be signaled to indicate if the CIIP mode is applied to the current CU. The CIIP prediction may combine an inter prediction signal with an intra prediction signal. The inter prediction signal in the CIIP mode $P_{inter}$ may be derived using the same inter prediction process applied to regular merge mode. The intra prediction signal $P_{intra}$ may be derived following the regular intra prediction process with the planar mode.

Figure 11:
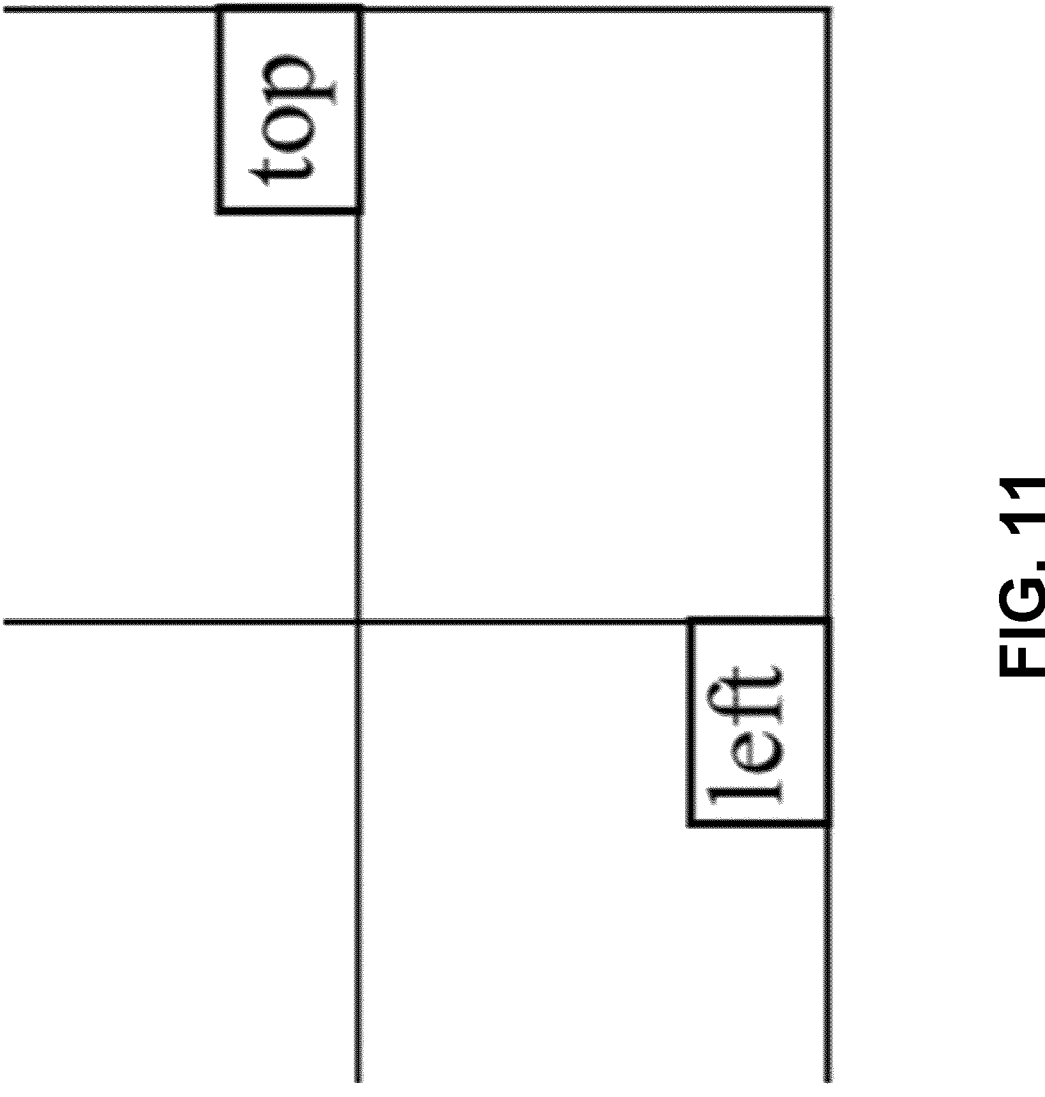
FIG. 11 illustrates an example of top and left neighboring blocks used in CIIP weight derivation.

FIG. 11 illustrates an example of top and left neighboring blocks used in CIIP weight derivation. In examples, the intra and inter prediction signals may be combined using weighted averaging, where in the weight value is calculated depending on the coding modes of the top and left neighboring blocks as follows: if the top neighbor is available and intra coded, then isIntraTop may be set to 1, otherwise isIntraTop may be set to 0; if the left neighbor is available and intra coded, then isIntraLeft may be set to 1, otherwise isIntraLeft may be set to 0; if (isIntraLeft+isIntraTop) is equal to 2, then wt may be set to 3; otherwise, if (isIntraLeft+isIntraTop) is equal to 1, then wt may be set to 2; and otherwise, wt may be set to 1. The CIIP prediction may be formed as follows:

$$P_{CIIP} = ((4 - wt) * P_{inter} + wt * P_{intra} + 2) \gg 2$$

If GDR is activated, the encoder may encode frames (e.g., a current frame) with a band of intra CUs. The frames (e.g., the current frame) may include at least one boundary (e.g., at least one virtual boundary) divided by slices and/or tiles. The frames being divided by at least one boundary into slices and/or tiles may allow for some tools (e.g., loop filtering) to avoid taking samples or information on a first side of the at least one boundary (e.g., the dirty area) when reconstructing samples in at least one second side of the boundary (e.g., the clean area).

Loop-filtering may be disabled or constrained at least one GDR band boundary because it may mix signals from the clean and dirty areas. As the band may be intra coded, the dirty area may be inter coded, and filtering may be disabled on the at least one boundary (typically the deblocking filters), it may create visual artifacts on the reconstructed image. The visual artifacts may be a moving line where the blocking artifacts are visible. As such, if GDR is enabled, reducing the visual artifacts at the at least one boundary between the clean and dirty areas is desired.

In some examples, the encoder may forbid using information (e.g., samples, predictors, etc.) taken in the dirty area. In examples, motion vector predictors may not be selected if they are in the dirty area of a frame (e.g., the current frame). In examples, the final motion vector may not be selected if they point to a reference frame in the dirty area. In examples, the intra direction may not be selected if they use reference samples in the dirty area. Slices, tiles, or boundaries (e.g., virtual boundaries) may be used to avoid dependency between the clean and dirty areas. Filtering may (e.g., may then) be disabled at the boundaries. As some loop filters may be disabled at the block level, the slices, tiles, or boundaries may allow the taking of samples in the dirty area while continuing to use loop filters elsewhere. In examples, for vertical boundaries, the deblocking filter may be disabled for horizontal filtering along the boundaries.

Examples of half-boundary filtering are provided herein. Half-boundary filtering may relax filtering constraints on the boundaries (e.g., virtual boundaries, slice boundaries, tile boundaries). Examples of an adhoc coding tool are provided herein. The ad hoc coding tool may provide a smoother clean area to dirty area transition and provide stronger/larger filtering.

In examples, loop filtering may be disabled for at least one entire boundary of a slice or tile or along at least one virtual boundary (e.g., either horizontal, vertical, or of boundaries of a clean area of any shape) signaled at the frame level. Loop filtering may disable filtering on both sides of the at least one boundary. If GDR is enabled, at the at least one GDR boundary, the filtering in the clean area (e.g., only the filtering in the clean area) may be disabled since it may use samples in the dirty area. The filtering in the dirty area may still be used to limit visual artifacts. To allow for filtering in the dirty area while preventing filtering in the clean area, half boundary filtering may be signaled. Half boundary filtering may allow filtering at the boundary location for samples in the dirty area (e.g., only in the dirty area).

Figure 12:
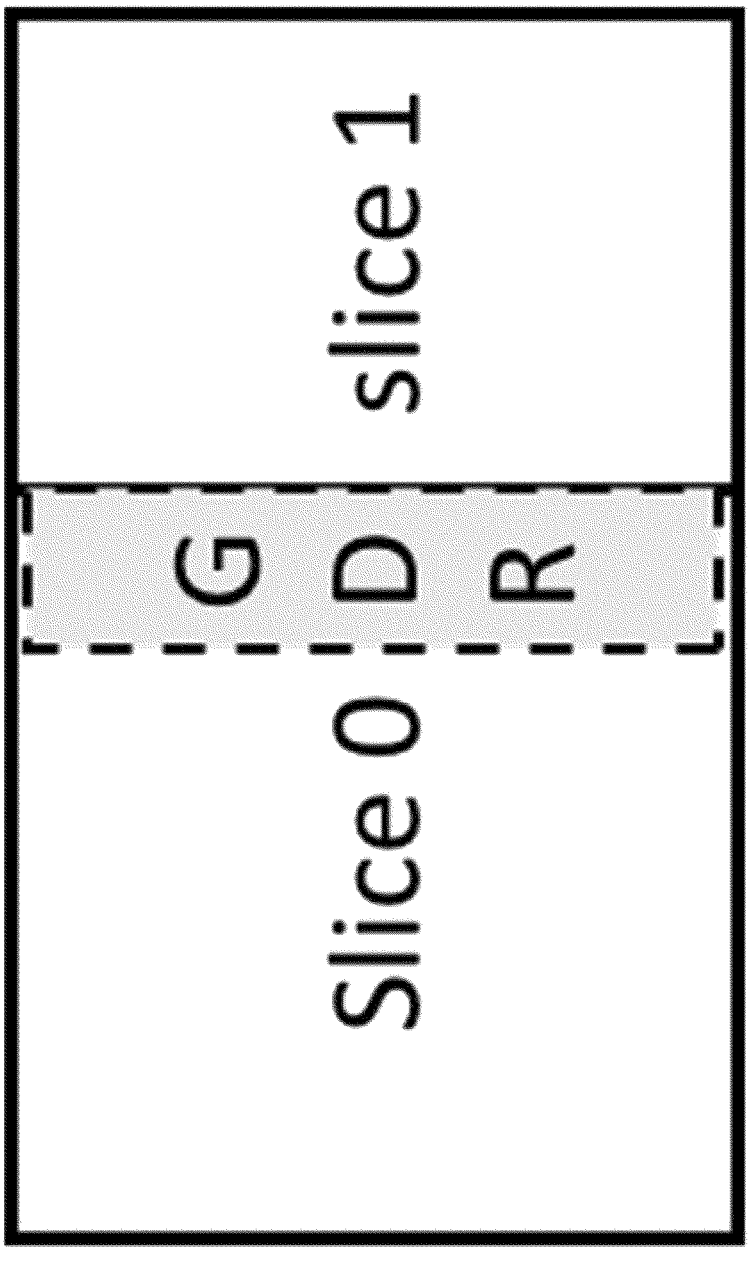
FIG. 12 illustrates an example of a slice layout for GDR.

FIG. 12 illustrates an example of a slice layout for GDR. Slice 0 may be the clean area. The right part of slice 0 may be the GDR band including intra coded blocks. Slice 1 may be the dirty area. In examples, a block (e.g., a current block) may be in a slice (e.g., slice 0 or slice 1) and the neighboring samples may be in a different slice (e.g., slice 0 or slice 1). The table below shows the changes to the PPS syntax in order to signal the half-boundary filtering features if using slices to separate the clean and dirty areas. The table is as follows:

```
if( pps_rect_slice_flag )
        pps_single_slice_per_subpic_flag
if( pps_rect_slice_flag && !pps_single_slice_per_subpic_flag ) {
        pps_num_slices_in_pic_minus1
        if( pps_num_slices_in_pic_minus1 > 1 )
                pps_tile_idx_delta_present_flag
```

-continued

```
if( !pps_rect_slice_flag || pps_single_slice_per_subpic_flag ||
        pps_num_slices_in_pic_minus1 > 0 )
    pps_loop_filter_across_slices_enabled_flag
  if (!pps_loop_filter_across_slices_enabled_flag)
      pps_allow_loop_filter_per_slice_flag
    for( i = 0; i < pps_num_slices_in_pic_minus1; i++ ) {
        if( SliceTopLeftTileIdx[ i ] % NumTileColumns != NumTileColumns − 1 )
          pps_slice_width_in_tiles_minus1[ i ]
          if(pps_allow_loop_filter_per_slice_flag)
            pps_slice allow_loop_filter_flag[ i ]
        if( SliceTopLeftTileIdx[ i ] / NumTileColumns != NumTileRows − 1 &&
            ( pps_tile_idx_delta_present_flag ||
            SliceTopLeftTileIdx[ i ] % NumTileColumns = = 0 ) )
          pps_slice_height_in_tiles_minus1 [ i ]
        if( pps_slice_width_in_tiles_minus1[ i ] = = 0 &&
            pps_slice_height_in_tiles_minus1[ i ] = = 0 &&
            RowHeightVal[ SliceTopLeftTileIdx[ i ] / NumTileColumns ] > 1 ) {
          pps_num_exp_slices_in_tile[ i ]
          for( j = 0; j < pps_num_exp_slices_in_tile[ i ]; j++ )
            pps_exp_slice_height_in_ctus_minus1[ i ][ j ]
          i += NumSlicesInTile[ i ] − 1
        }
        if( pps_tile_idx_delta_present_flag && i < pps_num_slices_in_pic_minus1 )
          pps_tile_idx_delta_val[ i ]
    }
  }
}
pps_cabac_init_present_flag
```

A slice loop filtering mode indication (e.g., pps_allow_loop_filter_per_slice_flag) may be configured to indicate whether some slices may allow loop filters across at least one boundary (e.g., at least one virtual boundary) dividing the slices. The slice loop filtering mode indication may be configured to indicate whether neighboring samples are available for loop filtering associated with a block (e.g., a current block) based on a location of the neighboring samples relative to the current block. Based on the neighboring samples being outside of the slice of the current block, the slice loop filtering mode indication may be configured to indicate whether the neighboring samples are available for loop filtering associated with the current block based on the location of the neighboring samples relative to the region where the current block is located. If the indication is true, it may determine that the loop filtering mode (e.g., slice loop filtering mode) is enabled for the current picture (e.g., current frame). The current picture may include slices which may be divided by at the virtual boundary. If the indication is true, during the slice construction, the slice loop filtering mode indication may be read to specify that the particular slice i may be allowed to use samples outside the slice i during the loop filter process. In examples, if the slice loop filtering mode indication is first set to value indicating loop filtering mode is enabled, the slice 0 (as shown in FIG. 12) may be set with a slice loop filtering indication (e.g., a pps_slice allow_loop_filter_flag) indicating the samples inside slice 0 (e.g., the clean area) may not use samples inside slice 1 (e.g., the dirty area) for filtering (e.g., set to 0) and the slice 1 may be set with a slice loop filtering indication indicating the samples inside slice 1 (e.g., the dirty area) may use the samples in slice 0 (e.g., the clean area) for filtering (e.g., set to 1).

For a block (e.g., a current block) in a slice, whether neighboring samples located outside of the region (e.g., the slice) of the current block are available for loop filtering may be determined based on the slice loop filtering indication. Loop filtering may be performed based on the determination.

Based on the block (e.g., current block) being located in slice 1 (e.g., the dirty area) and the neighboring samples being located in slice 0 (e.g., the clean area), the neighboring samples may be determined to be available for loop filtering for the current block. Based on the neighboring samples being available for loop filtering, the encoder may set the slice loop filtering indication to a value indicating the neighboring samples are available for loop filtering for the current block (e.g., equal to 1). The decoder may be configured to obtain the slice loop filtering indication value indicating the neighboring samples are available for loop filtering for the current block (e.g., equal to 1), which may indicate the neighboring samples are available for loop filtering based on the block being in slice 1 (e.g., the dirty area) and the neighboring samples being located in slice 0 (e.g., the clean area). Based on the slice loop filtering indication indicating the samples are available for loop filtering, the decoder may determine the neighboring samples are available for loop filtering. The decoder may decode the current block based on that determination.

Based on the block (e.g., current block) being located in slice 0 (e.g., the clean area) and the neighboring samples being located in slice 1 (e.g., the dirty area), the neighboring samples may be determined to be unavailable for loop filtering for the current block. Based on the neighboring samples being unavailable for loop filtering, the encoder may set the slice loop filtering indication to a value indicating the neighboring samples are unavailable for loop filtering for the current block (e.g., equal to 0). The decoder may be configured to obtain the slice loop filtering indication value indicating the neighboring samples are unavailable for loop filtering for the current block (e.g., equal to 0), which may indicate the neighboring samples are unavailable for loop filtering based on the block being in slice 0 (e.g., the clean area) and the neighboring samples being located in slice 1 (e.g., the dirty area). Based on the slice loop filtering indication indicating the samples are unavailable for loop filtering, the decoder may determine the neighboring samples are unavailable for loop filtering. The decoder may decode the current block based on that determination.

In examples, if a slice loop filtering mode indication is not present, it may be inferred to a value indicating the neighboring samples are unavailable for loop filtering for the current block (e.g., equal to 0) and a slice loop filtering indication may be inferred to a value that indicates that particular slice is not allowed to use neighboring samples (e.g., equal to 0). In examples, the slice loop filtering mode indication may not be signaled, and the slice loop filtering mode indication may be signaled if (e.g., only if) pps_loop_filter_across_slices_enabled_flag is false. In examples, if loop filters are allowed, a slice loop filtering indication) may be signaled to disable the loop filter at the boundaries for that slice (e.g., only that slice).

In examples, tiles may be used to specify dirty and clean areas. The tiles may be used in a similar way as the slices described herein. In examples, tile 0 may be the clean area and tile 1 may be the dirty area. In the table below, if the loop filter is disabled at a tile boundary, a flag per tile may be read to allow or not the filter on a tile basis. The table is as follows:

```
if( !pps_no_pic_partition_flag ) {
    pps_log2_ctu_size_minus5                                  u(2)
    pps_num_exp_tile_columns_minus1                          ue(v)
    pps_num_exp_tile_rows_minus1                             ue(v)
    for( i = 0; i <= pps_num_exp_tile_columns_minus1; i++ )
        pps_tile_column_width_minus1[ i ]                   ue(v)
    for( i = 0; i <= pps_num_exp_tile_rows_minus1; i++ )
        pps_tile_row_height_minus1[ i ]                     ue(v)
    if( NumTilesInPic > 1 ) {
        pps_loop_filter_across_tiles_enabled_flag            u(1)
        pps_rect_slice_flag                                  u(1)
    }
    if(!pps_loop_filter_across_tiles_enabled_flag ) {
        pps_allow_loop_filter_per_tile_flag                  u(1)
        if (pps_allow_loop_filter_per_tile_flag)
            for( i = 0; i <= pps_num_exp_tile_columns_minus1; i++
            )
                pps_tiles allow_loop_filter_flag [i]         u(1)
    }
```

A tile loop filtering mode indication (e.g., pps_allow_loop_filter_per_tile_flag) may be configured to indicate whether some tiles may allow loop filters across at least one boundary (e.g., at least one virtual boundary) dividing the tiles. The tile loop filtering mode indication may be configured to indicate whether neighboring samples are available for loop filtering associated with a block (e.g., a current block) based on a location of the neighboring samples relative to the current block. Based on the neighboring samples being outside of the tile of the current block, the slice loop filtering mode indication may be configured to indicate whether the neighboring samples are available for loop filtering associated with the current block based on the location of the neighboring samples relative to the region where the current block is located. If the indication is true, it may determine that the loop filtering mode (e.g., tile loop filtering mode) is enabled for the current picture (e.g., current frame). The current picture may include slices which may be divided by at the virtual boundary. If the indication is true, during the tile construction, the tile loop filtering mode indication may be read to specify that the particular tile i may be allowed to use samples outside the tile i during the loop filter process. In examples, if the tile loop filtering mode indication is first set to a value indicating loop filtering mode is enabled, the tile 0 may be set with a slice loop filtering indication (e.g., a pps_slice allow_loop_filter_flag) indicating the samples inside tile 0 (e.g., the clean area) may not use samples inside tile 1 (e.g., the dirty area) for filtering (e.g., set to 0) and the tile 1 may be set with a slice loop filtering indication indicating the samples inside tile 1 (e.g., the dirty area) may use the samples in tile 0 (e.g., the clean area) for filtering (e.g., set to 1).

For a block (e.g., a current block) in a tile, whether neighboring samples located outside of the region (e.g., the tile) of the current block are available for loop filtering may be determined based on the tile loop filtering indication. Loop filtering may be performed based on the determination.

Based on the block (e.g., current block) being located in tile 1 (e.g., the dirty area) and the neighboring samples being located in tile 0 (e.g., the clean area), the neighboring samples may be determined to be available for loop filtering for the current block. Based on the neighboring samples being available for loop filtering, the encoder may set the tile loop filtering indication to a value indicating the neighboring samples are available for loop filtering for the current block (e.g., equal to 1). The decoder may be configured to obtain the tile loop filtering indication value indicating the neighboring samples are available for loop filtering for the current block (e.g., equal to 1), which may indicate the neighboring samples are available for loop filtering based on the current block being in tile 1 (e.g., the dirty area) and the neighboring samples being located in tile 0 (e.g., the clean area). Based on the tile loop filtering indication indicating the samples are available for loop filtering, the decoder may determine the neighboring samples are available for loop filtering. The decoder may decode the current block based on that determination.

Based on the block (e.g., current block) being located in tile 0 (e.g., the clean area) and the neighboring samples being located in tile 1 (e.g., the dirty area), the neighboring samples may be determined to be unavailable for loop filtering for the current block. Based on the neighboring samples being unavailable for loop filtering, the encoder may set the tile loop filtering indication to a value indicating the neighboring samples are unavailable for loop filtering for the current block (e.g., equal to 0). The decoder may be configured to obtain the tile loop filtering indication value indicating the neighboring samples are unavailable for loop filtering for the current block (e.g., equal to 0), which may indicate the neighboring samples are unavailable for loop filtering based on the block being in tile 0 (e.g., the clean area) and the neighboring samples being located in tile 1 (e.g., the dirty area). Based on the slice loop filtering indication indicating the samples are unavailable for loop filtering, the decoder may determine the neighboring samples are unavailable for loop filtering. The decoder may decode the current block based on that determination.

In examples, if a tile loop filtering mode indication is not present, it may be inferred to a value indicating the neighboring samples are unavailable for loop filtering for the current block (e.g., equal to 0) and a tile loop filtering indication may be inferred to a value that indicates that particular tile is not allowed to use neighboring samples (e.g., equal to 0). In examples, the tile loop filtering mode indication may not be signaled, and the tile loop filtering mode indication may be signaled if (e.g., only if) pps_loop_filter_across_tiles_enabled_flag is false. In examples, if loop filters are allowed, a tile loop filtering indication may be signaled to disable the loop filter at the boundaries for that tile (e.g., only that tile).

Figure 13:
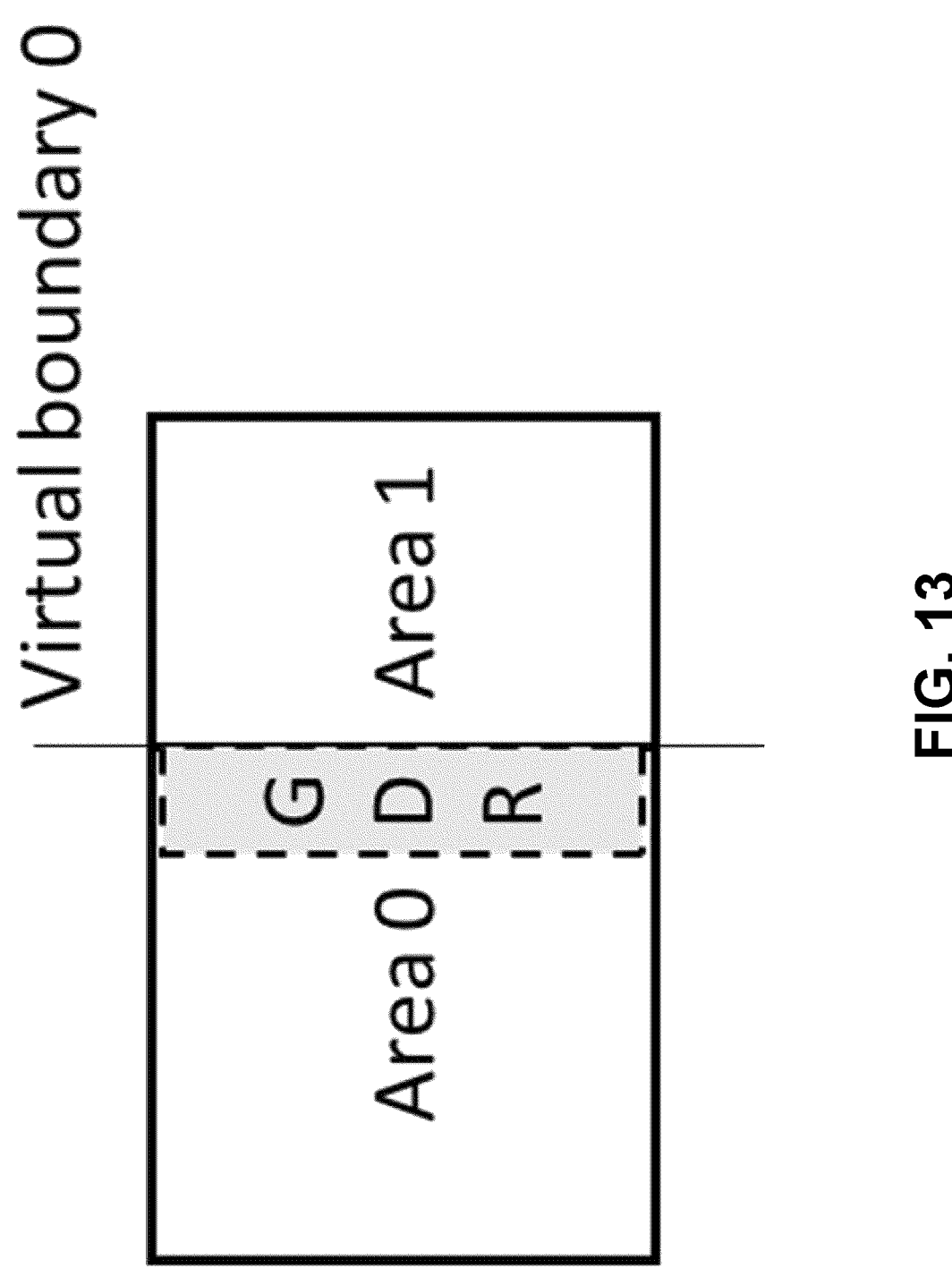
FIG. 13 illustrates an example of virtual boundaries and an area definition.

FIG. 13 illustrates an example of virtual boundaries and an area definition. In examples, areas may be used to specify dirty and clean areas. The areas may be used in a similar way as the slices and tiles described herein. The definition of an area according to the virtual boundaries definition may be as follows. A virtual boundary 0 may define the area 0 (left area of the virtual boundary, as shown in FIG. 13). The area 0 flag may be associated with ph_allow_virtual_boundaries_loop-filter_on_area [0] in the table below. Area 1 may be defined as after the last virtual boundary as the area remaining on the right (as shown in FIG. 13). ph_allow_virtual_boundar-ies_loopfilter_on_area [ph_num_ver_virtual_boundaries] may be the indication associated with the last area (area 1 in this case). In the table below, if the loop filter is disabled at virtual boundaries, a flag per area may be read to allow or not the filter on an area basis. The table is as follows:

```
if( sps_virtual_boundaries_enabled_flag && !sps_virtual_boundaries_present_flag ) {
    ph_virtual_boundaries_present_flag                                          u(1)
    ph_virtual_boundaries_loopfilter_per_boundary_flag                          u(1)
    if( ph_virtual_boundaries_present_flag ) {
        ph_num_ver_virtual_boundaries                                           ue(v)
        for( i = 0; i < ph_num_ver_virtual_boundaries; i++ ) {
            ph_virtual_boundary_pos_x_minus1[ i ]                               ue(v)
            if (ph_virtual_boundaries_loopfilter_per_boundary_flag)
                ph_allow_virtual_boundaries_loopfilter_on_area[ i ]             u(1)
        }
        if (ph_virtual_boundaries_loopfilter_per_boundary_flag)
            ph_allow                                                            u(1)
virtual_boundaries_loopfilter_on_area[ ph_num_ver_virtual_boundaries ]
        ph_num_hor_virtual_boundaries                                           ue(v)
        for( i = 0; i < ph_num_hor_virtual_boundaries; i++ ) {
            ph_virtual_boundary_pos_y_minus1[ i ]                               ue(v)
            if (ph_virtual_boundaries_loopfilter_per_boundary_flag)
                ph_allow_virtual_boundaries_loopfilter_on_area[ i ]             u(1)
        }
        if (ph_virtual_boundaries_loopfilter_per_boundary_flag)
            ph_allow                                                            u(1)
virtual_boundaries_loopfilter_on_area[ ph_num_hor_virtual_boundaries ]
    }
}
```

A virtual boundary loop filtering mode indication (e.g., a ph_virtual_boundaries_loopfilter_per_boundary_flag) may be read to signal that some areas may allow loop filters across the at least one boundary (e.g., at least one virtual boundary) divided by the areas. The virtual boundary loop filtering mode indication may be configured to indicate whether neighboring samples are available for loop filtering associated with a block (e.g., current block) based on a location of the neighboring samples relative to the current block. Based on the neighboring samples being out of the area of the current block, the virtual boundary loop filtering mode indication may be configured to indicate whether the neighboring samples are available for loop filtering associ-ated with the current block based on the location of the neighboring samples relative to the region where the current block is located. If the indication is true, it may determine that the loop filtering mode (e.g., virtual boundary loop filtering mode indication) is enabled for the current picture (e.g., current frame). The current picture may include areas which may be divided at the virtual boundary. If the indi-cation is true, during the area construction, the virtual boundary loop filtering mode indication may be read to specify that the particular area i may be allowed to use samples outside the area i during the loop filter process. In examples, if the virtual boundary loop filtering mode indi-cation is first set to a value indicating loop filtering mode is enabled, the area 0 (as shown in FIG. 13) may be set with a virtual boundary loop filtering indication (e.g., ph_allow-_virtual_boundaries_loopfilter_on_area) indicating the samples inside area 0 (e.g., the clean area) may not use samples inside the area 1 (e.g., the dirty area) for filtering (e.g., set to 0) and the area 1 may set with a virtual boundary loop filtering indication indicating the samples inside area 1 (e.g., the dirty area) may use the samples in tile 0 (e.g., the clean area) for filtering (e.g., set to 1).

For a block (e.g., current block) in an area, whether neighboring samples located outside of the region (e.g., the area) of the current block are available for loop filtering may be determined based on the virtual boundary loop filtering indication. Loop filtering may be performed based on the determination.

Based on the block (e.g., current block) being located in area 1 (e.g., the dirty area) and the neighboring samples being located in area 0 (e.g., the clean area), the neighboring samples may be determined to be available for loop filtering for the current block. Based on the neighboring samples being available for loop filtering, the encoder may set the virtual boundary loop filtering indication to a value indicat-ing the neighboring samples are available for loop filtering for the current block (e.g., equal to 1). The decoder may be configured to obtain the virtual boundary loop filtering indication to a value indicating the neighboring samples are available for loop filtering for the current block (e.g., equal to 1), which may indicate the neighboring samples are available for loop filtering based on the current block being in area 1 (e.g., the dirty area) and the neighboring samples being located in area 0 (e.g., the clean area). Based on the virtual boundary loop filtering indication indicating the samples are available for loop filtering, the decoder may determine the neighboring samples are available for loop filtering. The decoder may decode the current block based on that determination.

Based on the block (e.g., current block) being located in area 0 (e.g., the clean area) and the neighboring samples being located in area 1 (e.g., the dirty area), the neighboring samples may be determined to be unavailable for loop filtering for the current block. Based on the neighboring samples being unavailable for loop filtering, the encoder may set the virtual boundary loop filtering indication to a value indicating the neighboring samples are unavailable for loop filtering for the current block (e.g., equal to 0). The decoder may be configured to obtain the virtual boundary loop filtering indication value indicating the neighboring samples are unavailable for loop filtering for the current block (e.g., equal to 0), which may indicate the neighboring samples are unavailable for loop filtering based on the block being in area 0 (e.g., the clean area) and the neighboring samples being located in area 1 (e.g., the dirty area). Based on the virtual boundary loop filtering indication) indicating the samples are unavailable for loop filtering, the decoder may determine the neighboring samples are unavailable for loop filtering. The decoder may decode the current block based on that determination.

In examples, if a virtual boundary loop filtering mode indication is not present, it may be inferred to a value indicating the neighboring samples are unavailable for loop filtering for the current block (e.g., equal to 0) and a a virtual boundary loop filtering indication may be inferred to a value that indicates that particular area is not allowed to use neighboring samples (e.g., equal to 0). In examples, the virtual boundary loop filtering mode indication may not be signaled, and the virtual boundary loop filtering indication may be signaled if (e.g., only if) ph_virtual_boundaries_loopfilter_per_boundary_flag is false. In examples, if loop filters are allowed, a virtual boundary loop filtering indication may be signaled to disable the loop filter at the boundaries for that area (e.g., only that area).

The virtual boundaries may apply to vertical virtual boundaries or horizontal virtual boundaries. In examples, the identification of the areas given the virtual boundaries may be generalized to the case where it exists for both vertical and horizontal boundaries. The vertical boundaries may be defined by a vertical virtual boundary indication (e.g., a ph_num_ver_virtual_boundaries flag). Based on the virtual boundary being a vertical virtual boundary, the clean area may be determined to be on a left side of the vertical virtual boundary and the dirty area may be determined to be on a right side of the vertical virtual boundary. The horizontal boundaries may be defined by a horizontal virtual boundary indication (e.g., a ph_num_hor_virtual_boundaries flag). Based on the virtual boundary being a horizontal virtual boundary, the clean area may be determined to be on a top side of the horizontal virtual boundary and the dirty area may be determined to be on a bottom side of the horizontal virtual boundary. In the table below, the flag for each region defined by the intersection of virtual boundaries (e.g., al virtual boundaries) may be read after the definition of each virtual boundary. The table is as follows:

| | |
|---|---|
| if( sps_virtual_boundaries_enabled_flag && !sps_virtual_boundaries_present_flag ) { | |
|     ph_virtual_boundaries_present_flag | u(1) |
|     ph_virtual_boundaries_loopfilter_per_boundary_flag | u(1) |
|     if( ph_virtual_boundaries_present_flag ) { | |
|         ph_num_ver_virtual_boundaries | ue(v) |
|         for( i = 0; i < ph_num_ver_virtual_boundaries; i++ ) | |
|             ph_virtual_boundary_pos_x_minus1[ i ] | ue(v) |
|         ph_num_hor_virtual_boundaries | ue(v) |
|         for( i = 0; i < ph_num_hor_virtual_boundaries; i++ ) | |
|             ph_virtual_boundary_pos_y_minus1[ i ] | ue(v) |
|     if (ph_virtual_boundaries_loopfilter_per_boundary_flag) { | |
|       for( i = 0; i <= ph_num_ver_virtual_boundaries; i++ ) | |
|         for( j = 0; j <= ph_num_hor_virtual_boundaries; j++ ) | |
|             ph_allow_virtual_boundaries_loopfilter_on_area[ i ][j] | u(1) |
|     } | |

In examples, sps signaled virtual boundaries may be provided, adding new flags sps_allow_virtual_boundaries_loopfilter_on_area to allow filtering in some areas. The table below shows the syntax. The table is as follows:

```
sps_sign_data_hiding_enabled_flag                              u(1)
sps_virtual_boundaries_enabled_flag                           u(1)
if( sps_virtual_boundaries_enabled_flag ) {
    sps_virtual_boundaries_present_flag                       u(1)
    if( sps_virtual_boundaries_present_flag ) {
        sps_virtual_boundaries_loopfilter_per_boundary_flag   u(1)
        sps_num_ver_virtual_boundaries                        ue(v)
        for( i = 0; i < sps_num_ver_virtual_boundaries; i++ ) {
            sps_virtual_boundary_pos_x_minus1[ i ]            ue(v)
            if
            (sps_virtual_boundaries_loopfilter_per_boundary_flag)
                sps_allow_ virtual_boundaries_loopfilter_on_area[ i
                ]
        }
        sps_num_hor_virtual_boundaries                        ue(v)
        for( i = 0; i < sps_num_hor_virtual_boundaries; i++ ) {
            sps_virtual_boundary_pos_y_minus1[ i ]            ue(v)
            if
            (sps_virtual_boundaries_loopfilter_per_boundary_flag)
                sps_allow_ virtual_boundaries_loopfilter_on_area[ i
                ]
        }
    }
}
```

A virtual boundary loop filtering mode indication (e.g., a sps_virtual_boundaries_loopfilter_per_boundary_flag) may be read to signal that some areas may allow loop filters across the at least one boundary (e.g., at least one virtual boundary) divided by the areas. The virtual boundary loop filtering mode indication may be configured to indicate whether neighboring samples are available for loop filtering associated with a block (e.g., current block) based on a location of the neighboring samples relative to the current block. Based on the neighboring samples being out of the area of the current block, the virtual boundary loop filtering mode indication may be configured to indicate whether the neighboring samples are available for loop filtering associated with the current block based on the location of the neighboring samples relative to the region where the current block is located. If the indication is true, it may determine that the loop filtering mode (e.g., virtual boundary loop filtering mode indication) is enabled for the current picture (e.g., current frame). The current picture may include areas which may be divided at the virtual boundary. If the indication is true, during the area construction, the virtual boundary loop filtering mode indication may be read to specify that the particular area i may be allowed to use samples outside the area i during the loop filter process. In examples, if the virtual boundary loop filtering mode indication is first set to a value indicating loop filtering mode is enabled, the area 0 (as shown in FIG. 13) may be set with a virtual boundary loop filtering indication (e.g., sps_allow_virtual_boundaries_loopfilter_on_area) indicating the samples inside area 0 (e.g., the clean area) may not use samples inside the area 1 (e.g., the dirty area) for filtering (e.g., set to 0) and the area 1 may set with a virtual boundary loop filtering indication indicating the samples inside area 1 (e.g., the dirty area) may use the samples in tile 0 (e.g., the clean area) for filtering (e.g., set to 1).

For a block (e.g., current block) in an area, whether neighboring samples located outside of the region (e.g., the area) of the current block are available for loop filtering may be determined based on the virtual boundary loop filtering indication. Loop filtering may be performed based on the determination.

Based on the block (e.g., current block) being located in area 1 (e.g., the dirty area) and the neighboring samples being located in area 0 (e.g., the clean area), the neighboring samples may be determined to be available for loop filtering for the current block. Based on the neighboring samples being available for loop filtering, the encoder may set the virtual boundary loop filtering indication to a value indicating the neighboring samples are available for loop filtering for the current block (e.g., equal to 1). The decoder may be configured to obtain the virtual boundary loop filtering indication to a value indicating the neighboring samples are available for loop filtering for the current block (e.g., equal to 1), which may indicate the neighboring samples are available for loop filtering based on the current block being in area 1 (e.g., the dirty area) and the neighboring samples being located in area 0 (e.g., the clean area). Based on the virtual boundary loop filtering indication indicating the samples are available for loop filtering, the decoder may determine the neighboring samples are available for loop filtering. The decoder may decode the current block based on that determination.

Based on the block (e.g., current block) being located in area 0 (e.g., the clean area) and the neighboring samples being located in area 1 (e.g., the dirty area), the neighboring samples may be determined to be unavailable for loop filtering for the current block. Based on the neighboring samples being unavailable for loop filtering, the encoder may set the virtual boundary loop filtering indication to a value indicating the neighboring samples are unavailable for loop filtering for the current block (e.g., equal to 0). The decoder may be configured to obtain the virtual boundary loop filtering indication value indicating the neighboring samples are unavailable for loop filtering for the current block (e.g., equal to 0), which may indicate the neighboring samples are unavailable for loop filtering based on the block being in area 0 (e.g., the clean area) and the neighboring samples being located in area 1 (e.g., the dirty area). Based on the virtual boundary loop filtering indication) indicating the samples are unavailable for loop filtering, the decoder may determine the neighboring samples are unavailable for loop filtering. The decoder may decode the current block based on that determination.

sps_virtual_boundaries_loopfilter_per_boundary_flag being equal to 1 may specify that information of loop filtering is signaled in the SPS syntax structure and defined by areas separated by the virtual boundaries. Otherwise loop filter is always disabled at virtual boundaries. When not present the value of the sps_virtual_boundaries_loopfilter_per_boundary_flag is inferred to be equal to 0.

sps_allow_virtual_boundaries_loopfilter_on_area [i][j] (e.g., a virtual boundary loop filtering indication) being equal to 1 may specify if loop filtering is allowed for the area defined by (i−1)-th and the i-th vertical boundaries and the (j−1)-th and the j-th horizontal boundaries.

In examples, a constraint flag gci_no_allow_virtual_boundaries_constraint_flag may be added to control the flag sps_virtual_boundaries_loopfilter_per_boundary_flag in the general constraints information syntax. If the flag is true, it may specify that sps_virtual_boundaries_loopfilter_per_boundary for pictures (e.g., all pictures) should be equal to 0. gci_no_allow_virtual_boundaries_constraint_flag equal to 0 may not impose such a constraint. The table below shows the syntax. The table is as follows:

| | |
|---|---|
| gci_no_lmcs_constraint_flag | u(1) |
| gci_no_ladf_constraint_flag | u(1) |
| gci_no_virtual_boundaries_constraint_flag | u(1) |
| gci_no_allow_virtual_boundaries_constraint_flag | u(1) |

The ph_virtual_boundaries_present_flag equal to 1 may specify that information of virtual boundaries is signaled in the PH syntax structure. ph_virtual_boundaries_present_flag equal to 0 may specify that information of virtual boundaries is not signaled in the PH syntax structure. If there is one or more than one virtual boundary signaled in the PH syntax structure, the in-loop filtering operations may be disabled across the virtual boundaries in the picture. The in-loop filtering operations may include the deblocking filter, sample adaptive offset filter, and adaptive loop filter operations. if not present, the value of ph_virtual_boundaries_present_flag is inferred to be equal to 0.

The variable VirtualBoundariesPresentFlag may be derived as follows:

VirtualBoundariesPresentFlag=0
if(sps_virtual_boundaries_enabled_flag)
    VirtualBoundariesPresentFlag=sps_virtual_ boundaries_present_flag||
    ph_virtual_boundaries_present_flag If used to diable the loop filter process at the boundary, the VirtualBoundariesPresentFlag may be defined, using per area flags, as:

VirtualBoundariesPresentFlag=0
if(sps_virtual_boundaries_enabled_flag)
    VirtualBoundariesPresentFlag=(sps_virtual_boundaries_present_flag and sps_allow_virtual_boundaries_loopfilter_on_area[idx]||(
    ph_virtual_boundaries_present_flag and ph_allow_virtual_boundaries_loopfilter_on_area[idx])

where the idx may be the index of the current area being procesed, as described herein.

The deblocking filter process may be applied to subblock edges and may transform block edges of a picture, except one or more of the following types of edges: edges that are at the least one boundary of the picture; edges that coincide with the boundaries of a subpicture with subpicture index subpicIdx and sps_loop_filter_across_subpic_enabled_flag [subpicIdx] is equal to 0 and sps_loop_filter_across_subpic_exclusive is equal to 0; edges that coincide with the virtual boundaries of the picture when VirtualBoundariesPresentFlag is equal to 1, and virtual_boundaries_loopfilter_on_area[idx] is equal to 0; edges that coincide with tile boundaries when pps_loop_filter_across_tiles_enabled_flag is equal to 0, and pps_tiles allow_loop_filter[idx] is equal to 0; edges that coincide with slice boundaries when pps_loop_filter_across_slices_enabled_flag is equal to 0 and pps_slice allow_loop_filter[idx] is equal to 0; or edges that coincide with upper or left boundaries of slices with sh_deblocking_filter_disabled_flag equal to 1.

The variable filterEdgeFlag may be derived as follows: lifedgeType is equal to EDGE_VER and one or more of the following conditions are true, filterEdgeFlag is set equal to 0: the left boundary of the current coding block is the left boundary of the picture; the left boundary of the current coding block coincides with the left boundary of the current subpicture and sps_loop_filter_across_subpic_enabled_flag [CurrSubpicIdx] is equal to 0 or (sps_loop_filter_across_subpic_exclusive is equal to 1 and sps_loop_filter_across_subpic_enabled_flag[subpicIdx] is equal to 0), where subpicIdx is the subpicture index of the subpicture for which the left boundary of the current coding block coincides with the right subpicture boundary of that subpicture; the left boundary of the current coding block is the left boundary of the tile and pps_loop_filter_across_tiles_enabled_flag is equal to 0 and pps_tiles allow_loop_filter[idx] (with idx the index of the current tile) is equal to 0; and the left boundary of the current coding block is the left boundary of the slice and pps_loop_filter_across_slices_enabled_flag is equal to 0 and pps_slice allow_loop_filter[idx] (with idx the index of the current slice) is equal to 0. Similar examples may be applied for horiozntal edges if a horizontal GDR band is used, using horizontal virtual boundaries. Similar semantic adaptation may be applied for the SAO process.

Examples of the CTB modification process are provided herein. If Sao TypeIdx[cIdx][rx][ry] is equal to 2, the following apply: the values of hPos[k] and vPos[k] for k=0 . . . 1 are based on SaoEoClass[cIdx][rx][ry]; and the variable edgeIdx is derived as follows:
The modified sample locations $(xS_{ik}', yS_{jk}')$ and $(xY_{ik}', yY_{jk}')$ are derived as follows:

$$\left(xS'_{ik}, yS'_{jk}\right) = \left(xS_i + hPos[k], yS_j + vPos[k]\right)$$

$$\left(xY'_{ik}, yY'_{jk}\right) =$$

$$(cIdx == 0)?\left(xS'_{ik}, yS'_{jk}\right): \left(xS'_{ik} * SubWidthC, yS'_{jk} * SubHeightC\right)$$

If one or more of the following conditions are true, edgeIdx is set equal to 0: the sample at location $(xS_{ik}', yS_{jk}')$ for any k=0 . . . 1 is outside the picture boundaries; the sample at location $(xS_{ik}', yS_{jk}')$ for any k=0 . . . 1 belongs to a different subpicture and sps_loop_filter_across_subpic_enabled_flag [CurrSubpicIdx] for the subpicture to which the sample recPicture[xSi][ySj] belongs to is equal to 0; pps_loop_filter_across_slices_enabled_flag is equal to 0 and pps_slice allow_loop_filter[idx] (with idx the index of the current slice) is equal to 0 and the sample at location $(xS_{ik}', yS_{jk}')$ for any k=0 . . . 1 belongs to a different slice; pps_loop_filter_across_tiles_enabled_flag is equal to 0 and pps_tiles allow_loop_filter[idx] (with idx the index of the current tile) is equal to 0 and the sample at location $(xS_{ik}', yS_{jk}')$ for any k=0 . . . 1 belongs to a different tile; VirtualBoundariesPresentFlag is equal to 1 and ph_allow_virtual_boundaries_loopfilter_on_area[n] is equal to 1 xSi is equal to (VirtualBoundaryPosX[n]/scaleWidth)−1 for any n=0 . . . . NumVerVirtualBoundaries−1 and SaoEoClass [cIdx][rx][ry] is not equal to 1; VirtualBoundariesPresentFlag is equal to 1 and ph_allow_virtual_boundaries_loopfilter_on_area[n] is equal to 1 xSi is equal to VirtualBoundaryPosX[n]/scaleWidth for any n=0 . . . NumVerVirtualBoundaries−1 and SaoEoClass[cIdx][rx][ry] is not equal to 1; VirtualBoundariesPresentFlag is equal to 1 and ph_allow_virtual_boundaries_loopfilter_on_area[n] is equal to 1 ySj is equal to (VirtualBoundaryPosY[n]/scaleHeight)−1 for any n=0 . . . NumHorVirtualBoundaries−1 and SaoEoClass [cIdx][rx][ry] is not equal to 0; or VirtualBoundariesPresentFlag is equal to 1 and ph_allow_virtual_boundaries_loopfilter_on_area[n] is equal to 1 ySj is equal to VirtualBoundaryPosY[n]/scaleHeight for any n=0 . . . NumHorVirtualBoundaries−1 and SaoEoClass[cIdx][rx][ry] is not equal to 0. Similar semantic adaptation may be applied for the ALF process.

As the transition from the clean area to the dirty area may introduce stronger visual artifacts and half of the at least one boundary (e.g., the right part of at least one virtual boundary) may allowed to be filtered, a stronger loop filter at the least one boundary may be introduced. The adaptation of the deblocking filter strength may be based on the location of the at least one boundary and the flags value. The variable bS[xDi][yDj] is derived as follows: if cIdx is equal to 0 and both samples p0 and q0 are in a coding block with intra_bdpcm_luma_flag equal to 1, bS[xDi][yDj] is set equal to 0; otherwise, if cIdx is greater than 0 and both samples p0 and q0 are in a coding block with intra_bdpcm_chroma_flag equal to 1, bS[xDi][yDj] is set equal to 0; otherwise, if CuPredMode[cIdx==0? 0:1][x0][y0] is equal to MODE_IN-TRA or CuPredMode[cIdx==0? 0:1][x1][y1] is equal to MODE_INTRA, bS[xDi][yDj] is set equal to 2, where (x0, y0) is the luma location corresponding to the top-left sample of the coding block containing the sample p0 and (x1, y1) is the luma location corresponding to the top-left sample of the coding block containing the sample q0; otherwise, if the area [x0][y0] and area [x1][y1] are different (samples are on each part of the at least one boundary) bS[xDi][yDj] is set equal to 2; and otherwise, if the sample p0 or q0 is in a coding block with ciip_flag equal to 1, bS[xDi][yDj] is set equal to 2.

Figure 14:
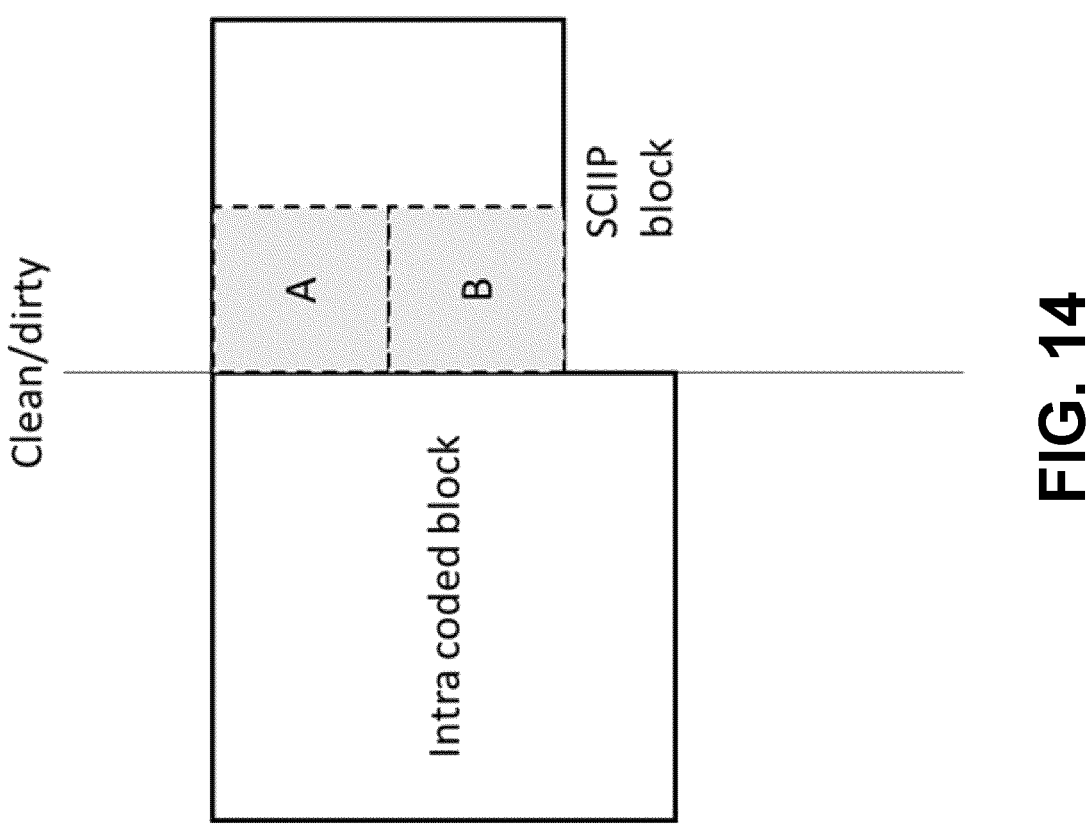
FIG. 14 illustrates an example of an example combined inter and intra prediction (CIIP) mode.

FIG. 14 illustrates an example of an example CIIP (SCIIP) mode. As shown in FIG. 14, the layout of a block in the dirty area close to the vertical boundry clean/dirty areas as follows: on the left of the considered block, an intra block in the clean area, without filtering at the at least one boundary; and two subblocks insider the considered block.

The SCIIP mode may apply a process similar to the CIIP process with the following adaptation: the intra direction used for the mode may be the horizontal direction (e.g., that is reference samples from the clean area are propagated in the block horizontally); and as in CIIP mode, the CU may use any inter code, the blending function between the intra prediction and the inter prediction may be adapted as follows, for example, using a smooth blending using a 4 pixels band. A set of subblocks (e.g., only a set of subblocks on the left side) may undergo the blending process. The rest of the subblocks may (e.g., may only) use the inter prediction. The CIIP blending equation is as follows:

$$P_{CIIP} = (wt * P_{inter} + (4 - wt) * P_{intra} + 2) \gg 2$$

where the wt factor may be adapted depending on the distance to the left border (e.g., corresponding to the boundary of clean/dirty areas)/wt=distance to left boundary in pixels. In examples, wt=0 for the pixel on the left border of the CU. Similar examples may be generalized for longer or shorter smoothing transitions, for example, 8 pixels band (2 sub-blocks), etc.

In examples, intra directions (e.g., several intra directions) around the horizontal direction may be made available for the SCIIP mode, e.g., either explicitly signaled or deduced from the available reference samples. In examples, the SCIIP mode may be forced for the blocks on the at least one boundary in the dirty area, avoiding the signaling of the mode. In examples, the mode may be added as a separate mode for block on the at least one boundary (e.g., only for the block on the at least one boundary). In examples, the mode may replace the CIIP mode for blocks on the at least one boundary. In examples, the mode may be made available for the blocks with intra coded mode on the left boundary of the block. Similar examples may apply if the clean and dirty areas are layed out vertically. The intra direction may be adapted to be vertical in the SCIIP mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device for video decoding, comprising:
    a processor configured to:
        identify a boundary between a refreshed area and a non-refreshed area in a video frame;
        determine that a first sample is located in the refreshed area of the boundary and a second sample is located in the non-refreshed area of the boundary;
        modify a second loop filter associated with the second sample; and
        apply the modified second loop filter at the boundary to the second sample and disable a first loop filter associated with the first sample.

2. The device of claim 1, wherein the modified second loop filter is a stronger loop filter than the second loop filter unmodified.

3. The device of claim 1, wherein the modified second loop filter is applied based on the second sample being located on the non-refreshed area of the boundary and the first loop filter is disabled based on the first sample being located on the refreshed area of the boundary.

4. The device of claim 1, wherein the boundary is a vertical virtual boundary, and wherein the processor is further configured to:
    based on the boundary being the vertical virtual boundary, determine that the refreshed area is a clean area located on a left side of the vertical virtual boundary and the non-refreshed area is a dirty area located on a right side of the vertical virtual boundary.

5. The device of claim 1, wherein the processor is further configured to:
    determine that a loop filtering mode is enabled, wherein the second modified loop filter is applied to the second sample based on the determination that the loop filtering mode is enabled.

6. A method for video decoding, the method comprising:
    identifying a boundary between a refreshed area and a non-refreshed area in a video frame;
    determining that a first sample is located in the refreshed area of the boundary and a second sample is located in the non-refreshed area of the boundary;
    modifying a second loop filter associated with the second sample; and
    applying the modified second loop filter at the boundary to the second sample and disabling a, first loop filter associated with the first sample.

7. The method of claim 6, wherein the modified second loop filter is a stronger loop filter than the second loop filter unmodified.

8. The method of claim 6, wherein the modified second loop filter is applied based on the second sample being located on the non-refreshed area of the boundary and the first loop filter is disabled based on the first sample being located on the refreshed area of the boundary.

9. The method of claim 6, wherein the boundary is a vertical virtual boundary, further comprising:

based on the boundary being the vertical virtual boundary, determining that the refreshed area is a clean area located on a left side of the vertical virtual boundary and the non-refreshed area is a dirty area located on a right side of the vertical virtual boundary.

10. The method of claim 6, further comprising:

determining that a loop filtering mode is enabled, wherein the second modified loop filter is applied to the second sample based on the determination that the loop filtering mode is enabled.

11. A device for video encoding, comprising:

a processor configured to:

identify a boundary between a refreshed area and a non-refreshed area in a video frame;

determine that a first sample is located in the refreshed area of the boundary and a second sample is located in the non-refreshed area of the boundary;

modify a second loop filter associated with the second sample; and apply the modified second loop filter at the boundary to the second sample and disable a first loop filter associated with the first sample.

12. The device of claim 11, wherein the modified second loop filter is a stronger loop filter than the second loop filter unmodified.

13. The device of claim 11, wherein the modified second loop filter is applied based on the second sample being located on the non-refreshed area of the boundary and the first loop filter is disabled based on the first sample being located on the refreshed area of the boundary.

14. The device of claim 11, wherein the boundary is a vertical virtual boundary, and wherein the processor is further configured to:

based on the boundary being the vertical virtual boundary, determine that the refreshed area is a clean area located on a left side of the vertical virtual boundary and the non-refreshed area is a dirty area located on a right side of the vertical virtual boundary.

15. The device of claim 11, wherein the processor is further configured to:

signal that a loop filtering mode is enabled, wherein the second modified loop filter is applied to the second sample based on the determination that the loop filtering mode is enabled.

* * * * *